United States Patent
Takahashi et al.

(10) Patent No.: US 7,584,739 B2
(45) Date of Patent: Sep. 8, 2009

(54) INTERNAL COMBUSTION ENGINE WITH A PRECOMBUSTION CHAMBER

(75) Inventors: Eiji Takahashi, Yokosuka (JP); Toru Noda, Yokohama (JP); Akihiko Kakuho, Yokohama (JP); Isamu Hotta, Yokohama (JP); Koichi Ashida, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/637,930

(22) Filed: Dec. 13, 2006

(65) Prior Publication Data

US 2007/0151540 A1    Jul. 5, 2007

(30) Foreign Application Priority Data

Dec. 15, 2005   (JP)   ............................. 2005-361758

(51) Int. Cl.
F02B 19/10    (2006.01)
F02B 19/12    (2006.01)

(52) U.S. Cl. ........................ 123/267; 123/266

(58) Field of Classification Search .................. 123/267, 123/266, 293, 260, 126 R, 169 C, 143 R, 123/146.5 R, 470, 90.15; 313/193
See application file for complete search history.

(56) References Cited

U.S. PATENT DOCUMENTS

| | | | | |
|---|---|---|---|---|
| 1,803,250 A | * | 4/1931 | Hemmingsen | 123/276 |
| 2,682,862 A | * | 7/1954 | Camner | 123/276 |
| 3,974,818 A | * | 8/1976 | Noguchi et al. | 123/268 |
| 3,982,504 A | * | 9/1976 | Noguchi et al. | 123/260 |
| 4,009,702 A | * | 3/1977 | Mayer | 123/193.6 |
| 4,033,304 A | * | 7/1977 | Luria | 123/78 A |
| 4,127,095 A | * | 11/1978 | Noguchi et al. | 123/283 |
| 4,516,549 A | * | 5/1985 | Brear | 123/276 |
| 2004/0035402 A1 | * | 2/2004 | Collins et al. | 123/568.14 |

FOREIGN PATENT DOCUMENTS

JP    2004-285928    10/2004

* cited by examiner

Primary Examiner—Mahmoud Gimie
(74) Attorney, Agent, or Firm—Drinker Biddle & Reath LLP

(57) ABSTRACT

An internal combustion engine includes neighboring main and auxiliary combustion chambers that are separated by a partition wall including a communicating passage. Ignition of an air/fuel mixture in the auxiliary combustion chamber produces a fuel torch that is jetted into an air/fuel mixture in the main combustion chamber. Under a predetermined operation condition, timing for opening an intake valve is retarded relative to both the timing for closing an exhaust valve and the timing for top dead center of a piston on an exhaust stroke. By retarding the timing for opening the intake valve, residual gas in the auxiliary combustion that is left over from a previous cycle can be reduced.

19 Claims, 26 Drawing Sheets

NEAR TOP DEAD CENTER ON EXHAUST STROKE

INITIAL STAGE OF INTAKE STROKE

INTAKE VALVE OPEN PERIOD

FLOW TO AUXILIARY COMBUSTION CHAMBER

LATTER HALF OF INTAKE STROKE

INTAKE VALVE CLOSE PERIOD

COMPRESSION STROKE

TOP DEAD CENTER ON COMPRESSION STROKE

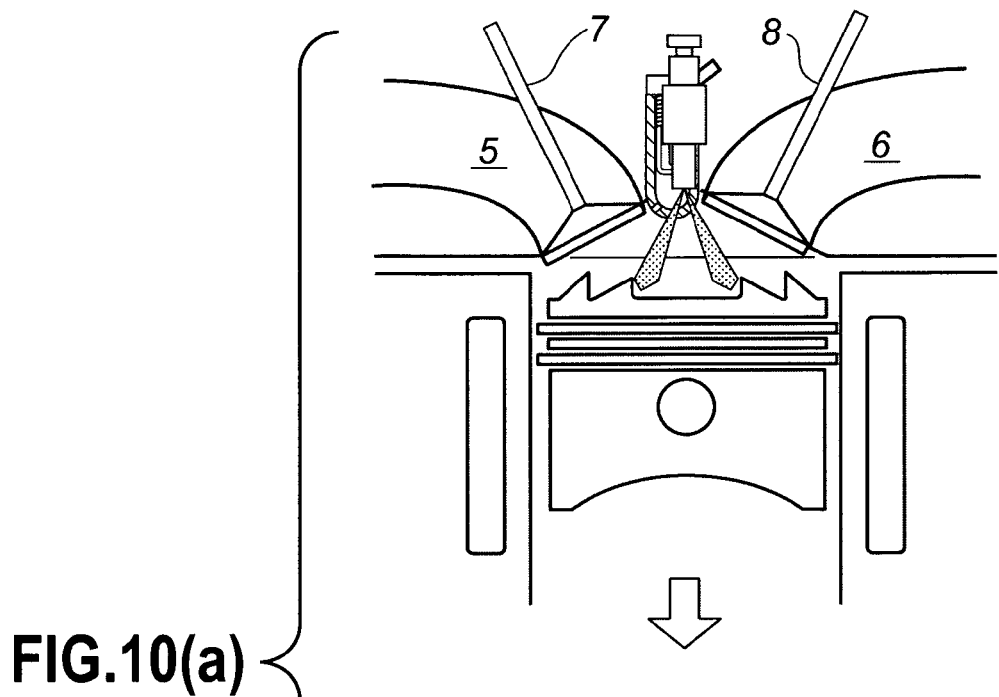
FIG.10(a)
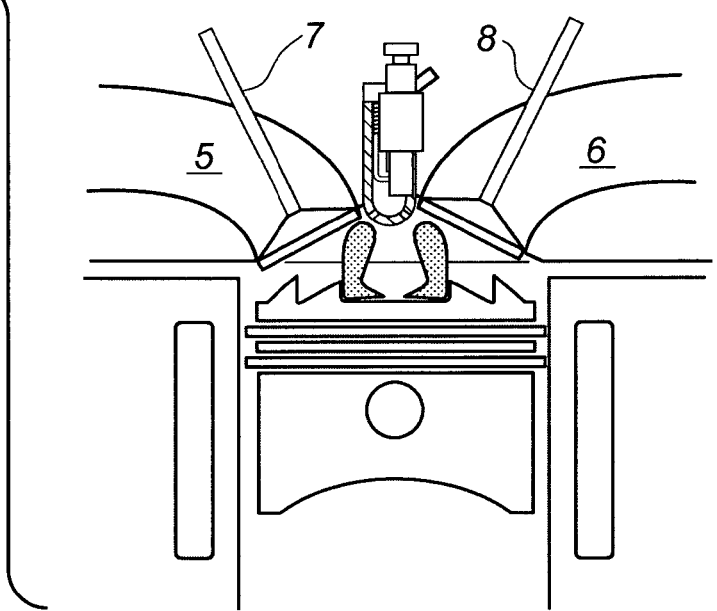
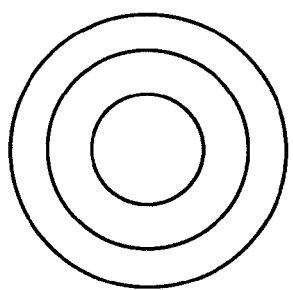
FIG.10(b)

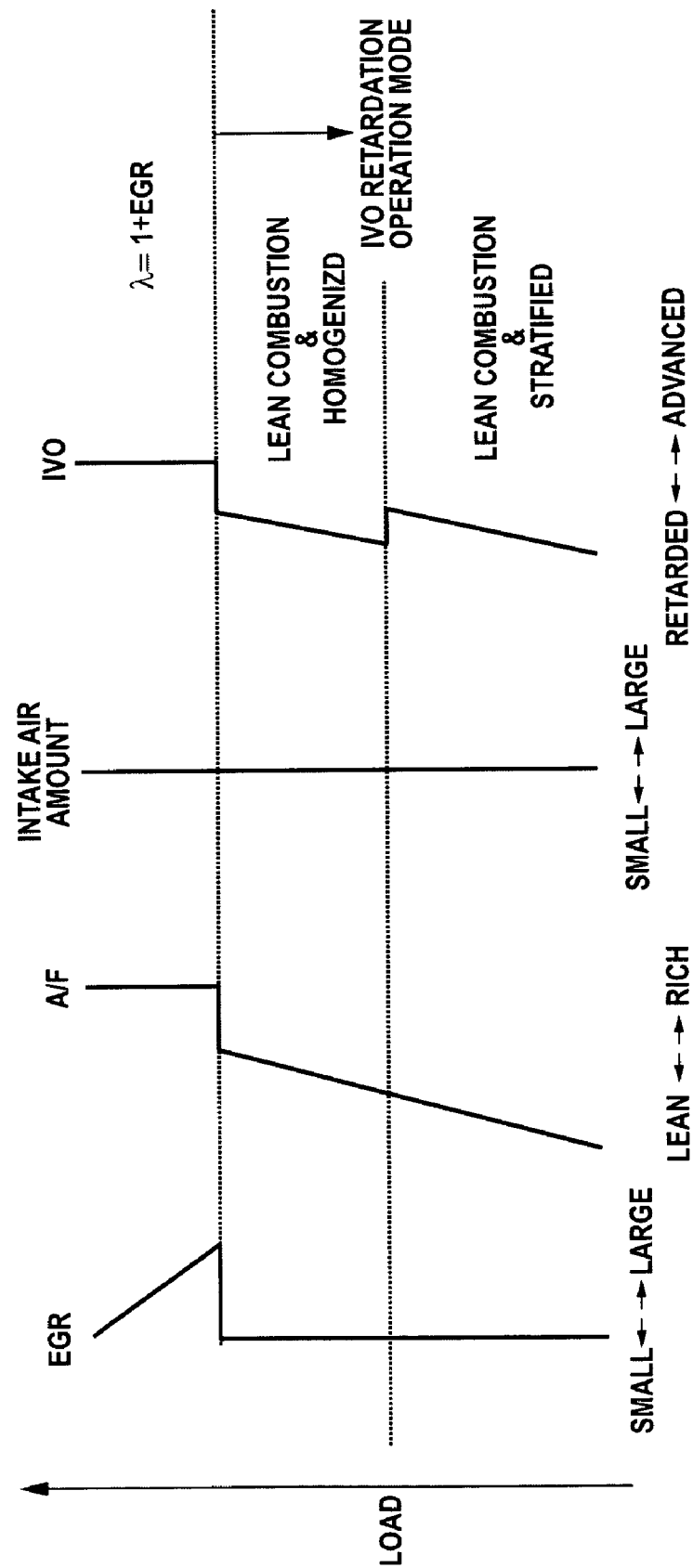

FIG.17(a)
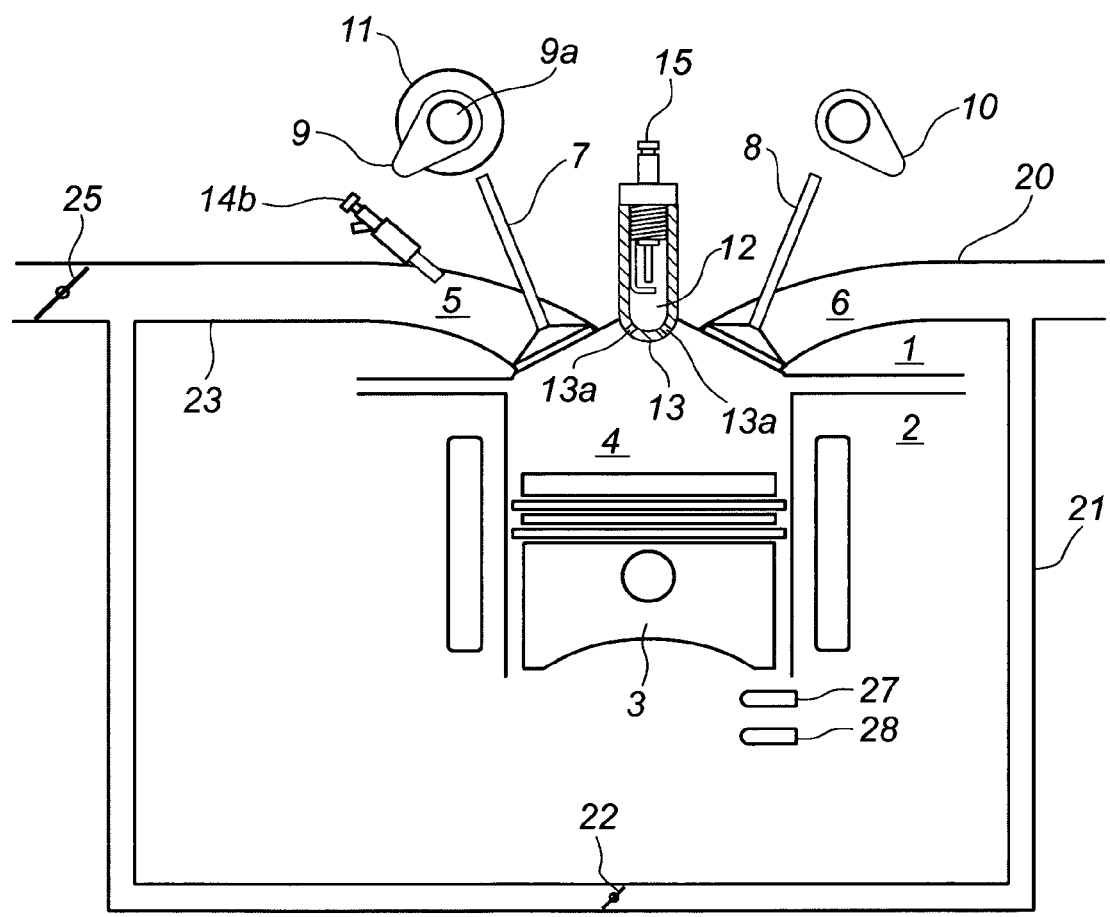
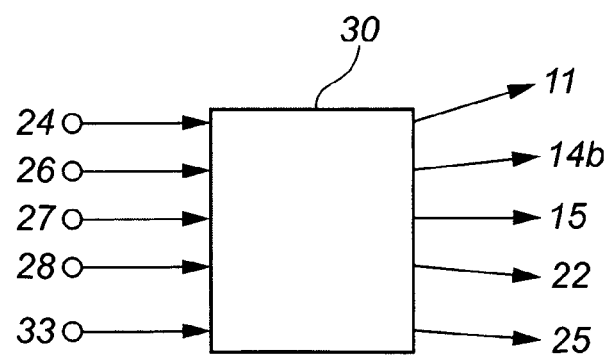
FIG.17(b)

NEAR TOP DEAD CENTER ON EXHAUST STROKE

INITIAL STAGE OF INTAKE STROKE

INTAKE VALVE OPEN PERIOD

FLOW TO AUXILIARY COMBUSTION CHAMBER

LATTER HALF OF INTAKE STROKE

INTAKE VALVE CLOSE PERIOD

COMPRESSION STROKE

TOP DEAD CENTER ON COMPRESSION STROKE

INTERNAL COMBUSTION ENGINE WITH A PRECOMBUSTION CHAMBER

CROSS-REFERENCE TO RELATED APPLICATIONS

This application claims priority under 35 U.S.C. § 119 to Japanese Patent Application No. 2005-361758, filed on Dec. 15, 2005, the disclosure of which is incorporated by reference herein in its entirety.

BACKGROUND OF THE INVENTION

1. Field of the Invention

The invention relates to an internal combustion engine having a main combustion chamber and an auxiliary combustion chamber, and more particularly to a technique for obtaining stable combustion with a relatively simple construction.

2. Description of Related Art

A related engine has an auxiliary combustion chamber in addition to a main combustion chamber. A torch like flame (also called a "fuel torch") is produced by igniting an air/fuel mixture in the auxiliary combustion chamber. The fuel torch is jetted into the main combustion chamber to shorten and stabilize the combustion process.

However, in the related engine, the auxiliary combustion chamber may tend to cause a poor torch jet (that is, unstable combustion) due to difficult ignition and a slower combustion speed in the auxiliary combustion chamber.

BRIEF SUMMARY OF THE INVENTION

Accordingly, there is provided an internal combustion engine with a relatively simple construction that reduces the presence of residual gas in an auxiliary combustion chamber and still provides stable combustion. Thus, the above-mentioned problem in the related art may be overcome.

There is also provided, according the present invention, an internal combustion engine including a piston, a main combustion chamber, an auxiliary combustion chamber, a partition disposed between the main and auxiliary combustion chambers, an exhaust valve, an intake valve, and a variable valve timing device coupled to the intake valve. The piston is reciprocally displaced in response to rotation of a crankshaft. The main combustion chamber is at least partially defined by the piston. The partition includes at least one passage that provides fluid communication between the main and auxiliary combustion chambers. The exhaust and intake valves are reciprocally disposed with respect to the main combustion chamber. The variable valve timing device retards movement of the intake valve relative to movements of the piston and the exhaust valve, such that the retarding produces first and second pressure differentials. The first pressure differential is across the at least one passage and between the main and auxiliary combustion chambers. The first pressure differential, which includes a lower pressure in the main combustion chamber relative to the auxiliary combustion chamber, is in response to an intake stroke of the piston. The second pressure differential is also across the at least one passage and between the main and auxiliary combustion chambers. The second pressure differential, which includes a higher pressure in the main combustion chamber relative to the auxiliary combustion chamber, is in response to an open configuration of the intake valve with respect to the main combustion chamber.

According the present invention, there is also provided an internal combustion engine that includes a main combustion chamber, intake and exhaust valves, an auxiliary combustion chamber, a partition wall provided between the main and auxiliary combustion chambers, a fuel injection valve, and an ignition plug. The main combustion chamber is defined partially by a piston, and the intake and exhaust valves partially define the main combustion chamber. The auxiliary combustion chamber has a capacity smaller than that of the main combustion chamber. The partition wall includes at least one communicating passage that provides fluid communication between the main and auxiliary combustion chambers. The fuel injection valve supplies to the main combustion chamber fuel that is to be combusted. The ignition plug is disposed with respect to the auxiliary combustion chamber such that the ignition plug initiates combustion in the auxiliary combustion chamber, and a torch flame is produced and jetted through the at least one communicating passage into the main combustion chamber to combust an air/fuel mixture in the main combustion chamber. An open timing of the intake valve is retarded relative to a close timing of the exhaust valve and a top dead center timing of the piston on an exhaust stroke. The open timing of the intake valve is retarded in response to an engine load being less than a predetermined value.

There is also provided, according the present invention, an internal combustion engine with a reciprocating piston, a main combustion chamber at least partially defined by the piston, a reciprocating exhaust valve, and a reciprocating exhaust valve. The internal combustion engine includes an auxiliary combustion chamber and variable valve timing means for reducing in the auxiliary combustion chamber residual gas from a previous cycle. The auxiliary combustion chamber is separated from the main combustion chamber by a partition that includes at least one passage that provides fluid communication between the main and auxiliary combustion chambers.

According the present invention, there is also provided, a method of reducing residual gas in an auxiliary combustion chamber of an internal combustion engine. The internal combustion engine includes a main combustion chamber that is separated from the auxiliary combustion chamber by a partition. The partition includes at least one passage that provides fluid communication between the main and auxiliary combustion chambers. The residual gas is from a previous combustion cycle of the internal combustion engine. The method includes retarding timing of an intake valve opening relative to an exhaust valve closing and to a piston reaching top dead center on an exhaust stroke, and coupling in fluid communication an intake passage to the main combustion chamber. The retarding produces a first pressure differential between the main and auxiliary combustion chambers, wherein pressure in the main combustion chamber is less than pressure in the auxiliary combustion chamber. The coupling occurs at the end of the retarding and after the piston reaches top dead center. The coupling produces a second pressure differential between the main and auxiliary combustion chambers, wherein pressure in the main combustion chamber is greater than pressure in the auxiliary combustion chamber.

Preferably, residual gas in the auxiliary combustion chamber at the time of ignition can be reduced, for example, by enhancing the flow of fresh air, so as to achieve easier ignition and more stable combustion.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 10(a) is a schematic illustration explaining a first fuel injection spray during an intake stroke in a modification of the internal combustion engine shown in FIG. 8(a).

FIG. 10(b) is a top view of a piston crown in the internal combustion engine shown in FIG. 10(a).

FIG. 16 illustrates a relationship between exhaust gas recirculation control, air/fuel ratio, intake air amount, and intake valve open timing in the internal combustion engine shown in FIG. 8(a).

FIG. 17(a) is a schematic illustration showing yet another construction of an internal combustion engine including an auxiliary combustion chamber.

FIG. 17(b) is a schematic of an electronic control unit for the internal combustion engine shown in FIG. 17(a).

DETAILED DESCRIPTION OF THE PREFERRED EMBODIMENTS

Figure 1A:
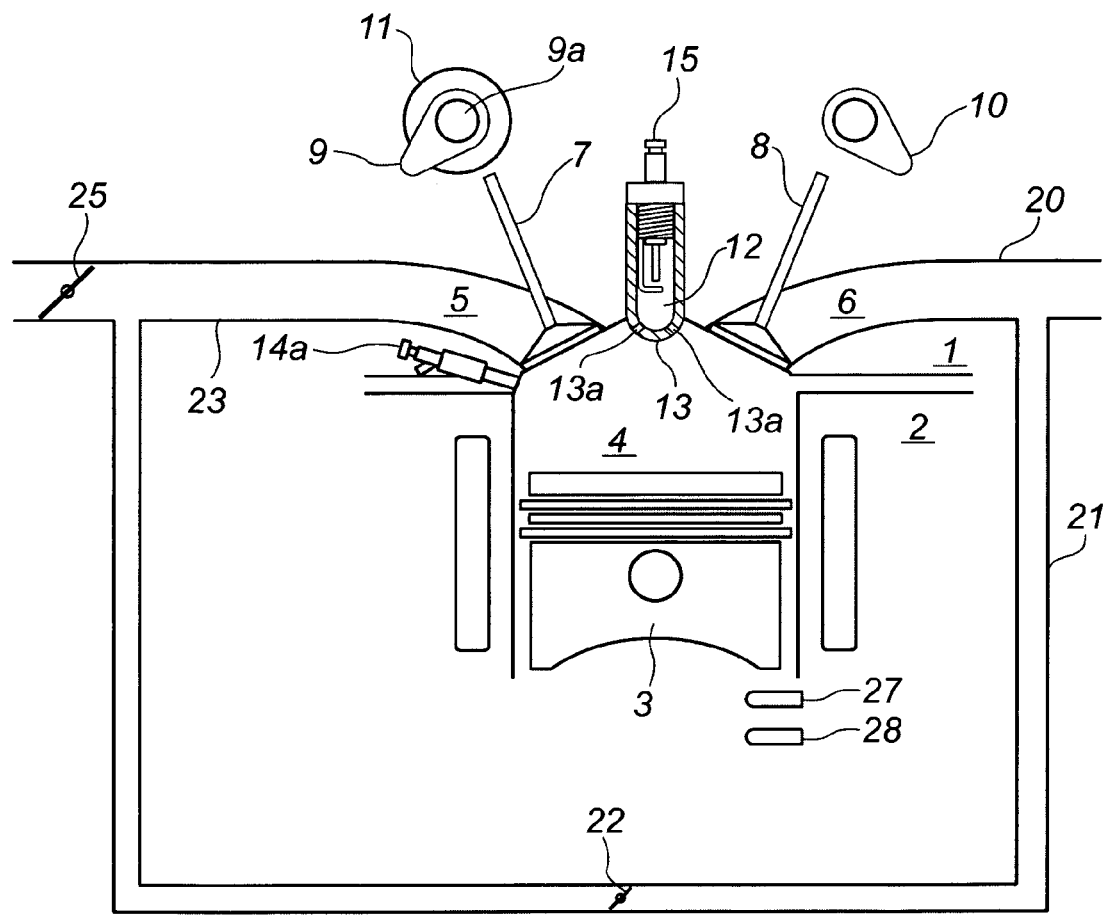
FIG. 1(a) is a schematic illustration showing a construction of an internal combustion engine including an auxiliary combustion chamber.

FIG. 1(a) shows a schematic view of an internal combustion engine ("ICE"). A cylinder head 1, a cylinder block 2, and a piston 3 define a main combustion chamber (also called a "main chamber") 4. The main combustion chamber 4 is connected to an intake port 5 through an intake valve 7, and connected to an exhaust port 6 through an exhaust valve 8.

Intake valve 7 and exhaust valve 8 are driven to open and close by an intake cam 9 and exhaust cam 10, respectively. A variable valve timing mechanism 11 is coupled to an end portion of an intake cam shaft 9a to which intake cam 9 is connected. The variable valve timing mechanism 11 may vary the phase of intake cam 9 during operation of the engine. As it is used herein, "phase" relates to the open/close timing of intake valve 7.

An intake passage 23 is connected upstream of intake port 5. Although not shown in FIG. 1(a), an intake collector and an air filter, which removes particulates from the intake air, may be disposed upstream of the intake passage 23. An air flow meter 24 (see FIG. 1(b)), which detects an amount of intake air flowing through the intake passage 23, and an electrically controlled throttle valve 25, which controls the amount of intake air flowing through the intake passage 23, may be disposed in the intake passage 23. An exhaust passage 20 is connected downstream of exhaust port 6. An exhaust gas recirculation ("EGR") passage 21, which supplies to intake passage 23 a portion of the exhaust gas that is discharged from main combustion chamber 4 to exhaust passage 20, is in fluid communication with exhaust passage 20. An EGR valve 22 that controls the amount of exhaust gas that is supplied to intake passage 23 is disposed in EGR passage 21.

An auxiliary combustion chamber (also called an "auxiliary chamber") 12 is at least partially disposed in cylinder head 1. The auxiliary combustion chamber 12 neighbors main combustion chamber 4. A partition wall 13 is defined between main combustion chamber 4 and auxiliary combustion chamber 12. Communicating passages 13a through partition wall 13 provide fluid communication between the two combustion chambers 4 and 12.

A fuel injection valve (also called a "fuel injector") 14a is preferably of a high pressure fuel injection type that is suitable for providing direct injection of fuel into main combustion chamber 4. That is, fuel injection valve 14a is so constructed and arranged that fuel is sprayed directly into main combustion chamber 4.

Figure 2:
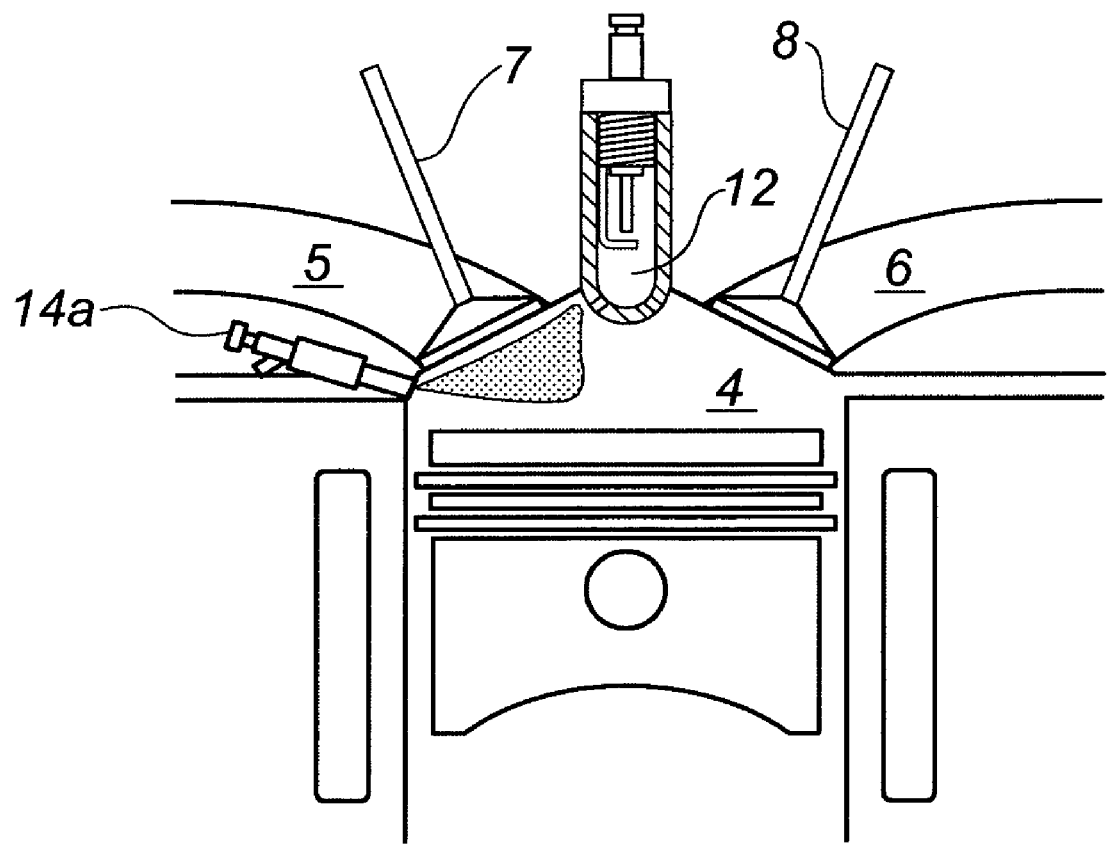
FIG. 2 is a schematic illustration explaining a condition of fuel spray produced in the internal combustion engine shown in FIG. 1(a).

An ignition plug (also called a "spark plug") 15 is disposed in auxiliary combustion chamber 12 to ignite an air/fuel ("A/F") mixture in auxiliary combustion chamber 12. Upon ignition of the A/F mixture in auxiliary combustion chamber 12, a fuel torch is jetted into main combustion chamber 4 through communicating passages 13a, and an A/F mixture in main combustion chamber 4 is combusted. Preferably, with additional reference to FIG. 2, at least part of the fuel spray from fuel injection valve 14a is directed toward communicating passages 13a.

Figure 1B:
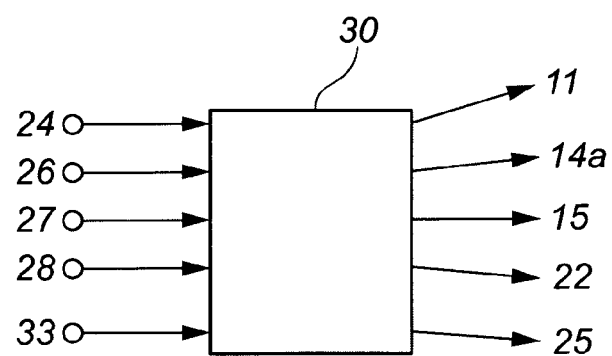
FIG. 1(b) is a schematic of an electronic control unit for the internal combustion engine shown in FIG. 1(a).

Referring to FIG. 1(b), variable valve timing device 11, fuel injection valve 14a, ignition plug 15, electrically controlled throttle valve 25, and the EGR valve 22 are controlled by an engine control unit ("ECU") 30 which, in turn, receives various signals that are indicative of ICE operating conditions. For example, ECU 30 may receive signals that indicate 1) the amount of intake air Qa that is detected by air flow meter 24, 2) an accelerator open degree APO that may be detected by an accelerator pedal sensor 26, 3) engine rotation speed Ne that may be detected by a crank angle sensor 27, 4) engine cooling water temperature Tw that may be detected by a water temperature sensor 28, and 5) vehicle speed that may be detected by a vehicle speed sensor 33. It is envisioned that signals that are indicative of other ICE operating conditions may also be provided to ECU 30. Based on the signals that are received, ECU 30 executes a predetermined calculation and sends out various signals. For example, ECU 30 may send control signals to 1) variable valve timing mechanism 11 to control valve timing, 2) fuel injection valve 14a to control fuel injection spray, 3) ignition plug 15 to properly time ignition, 4) throttle valve 25 to control intake air amount, and 4) EGR valve 22 to control EGR amount.

As will be described hereinafter, during predetermined ICE operation condition(s), intake valve open timing ("IVO") may be retarded for the purpose of stabilizing combustion. As it is used herein, the term "retard" refers to adjusting to a later time the occurrence of a function with respect to top dead center ("TDC"), i.e., the point at which piston 3 is reciprocated most closely proximate to cylinder head 1. Conventionally, retardation is measured in number of degrees of crankshaft rotation, often with respect to TDC. A function called "IVO retardation operation mode" refers to retarding the timing at which intake valve 7 opens.

Figure 3:
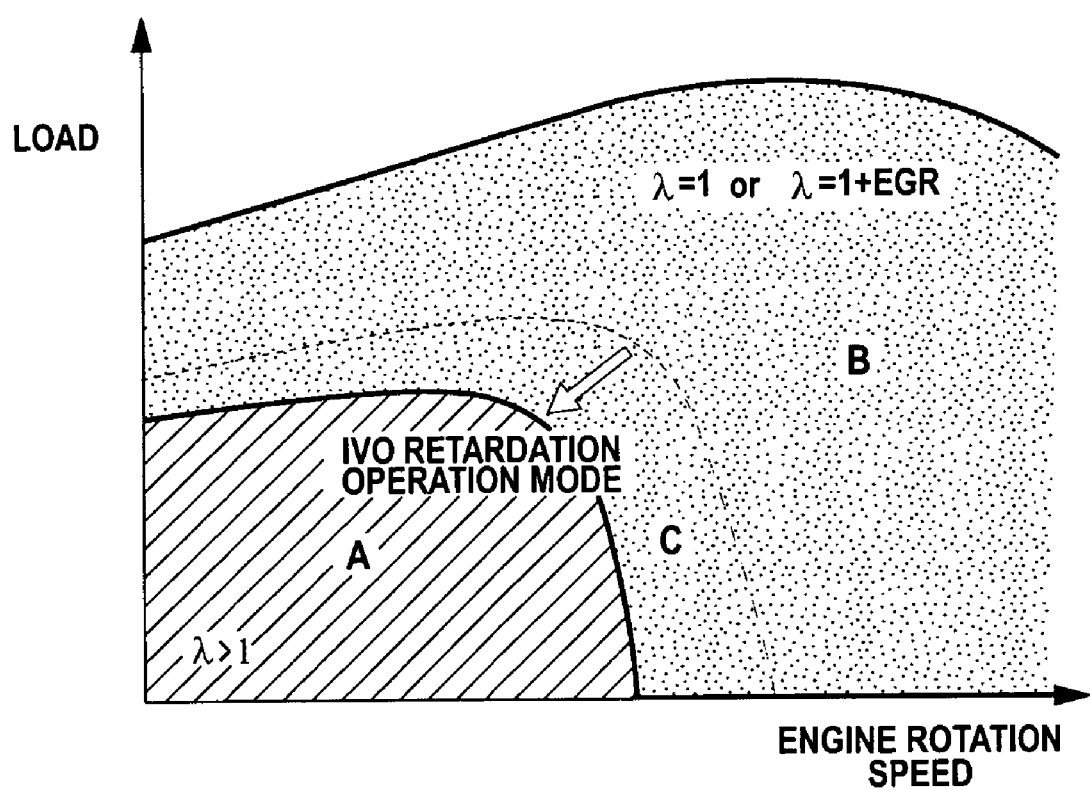
FIG. 3 is an operation map used in the internal combustion engine shown in FIG. 1(a).

FIG. 3 shows a preferred operation map of the ICE. A region of low-speed, low-load operation is indicated by reference letter A in FIG. 3. Region A may be characterized by "lean operation," i.e., the ICE operates with a lean A/F mixture (A/F ratio λ>1). In a range B, the ICE operates with a stoichiometric A/F ratio or operates at the stoichiometric A/F ratio with the addition of EGR. That is to say, the ICE operates at the stoichiometric A/F ratio with only fresh air (i.e., λ=1), or operates at the stoichiometric A/F ratio with fresh air and with EGR (i.e., [λ=1]+EGR). As it is used herein, "stoichiometric A/F ratio" refers to the chemically optimal point at which all the fuel and all the oxygen content of the air in a combustion chamber will perfectly balance each other out during combustion. For gasoline fuel, the stoichiometric A/F ratio is approximately 14.7 times the mass of air to fuel. Preferably, the IVO retardation operation mode is carried out only in region A (e.g., with lean operation) and in a region C, which is a portion of region B. Region C includes a predetermined low-speed, low-load part of region C in which the ICE operates at the stoichiometric A/F ratio with fresh air or operates at the stoichiometric A/F ratio with fresh air and with EGR.

The IVO retardation operation mode will now be described with reference to FIG. 4. As described hereinabove, the IVO retardation operation mode is a mode that retards the intake valve open timing (IVO) of intake valve 7 when a parameter representing combustion stability indicates a predetermined operation condition. For example, during lean operation of the ICE, such a parameter may be an air/fuel ratio greater than a predetermined value. More specifically, the IVO of intake valve 7 is retarded relative to both the exhaust valve close ("EVC") timing of exhaust valve 8 and the TDC timing of piston 3 on an exhaust stroke. As will become apparent, the IVO retardation operation mode reduces the presence of residual gas (this may also be considered as increasing the presence of fresh air) in auxiliary combustion chamber 12 at the time of ignition. Thus, the ignition is improved and the torch jet is hastened (or the torch flame is strengthened), which induces stable combustion. In particular, the IVO retardation operation mode facilitates ignition and improves combustion speed in auxiliary combustion chamber 12.

Figure 4A:
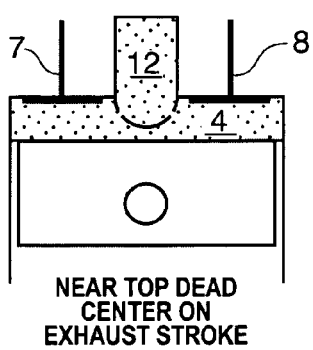
FIGS. 4(a) to 4(h) are schematic illustrations explaining an intake valve opening retardation operating mode employed in the internal combustion engine shown in FIG. 1(a).

When exhaust valve 8 is closed near the TDC timing of the exhaust stroke of piston 3, residual gas (i.e., from a previous cycle) is left or trapped in main combustion chamber 4 and in auxiliary combustion chamber 12, as illustrated in FIG. 4(a). In this case, particularly, the residual gas left in auxiliary combustion chamber 12 may make ignition more difficult and lower the combustion speed, and thereby result in poor combustion. Thus, it is desirable to reduce such residual gas.

Figure 4B:
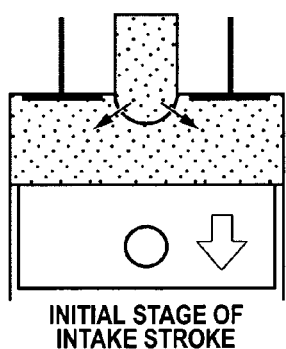

In a subsequent intake stroke, piston 3 moves away from cylinder head 1 causing expansion of the residual gas in main combustion chamber 4, and thereby lowers the pressure in main combustion chamber 4. Thus, there is produced a pressure differential between main combustion chamber 4 and auxiliary combustion chamber 12, and the residual gas in auxiliary combustion chamber 12 is drawn into main combustion chamber 4, as illustrated in FIG. 4(b).

Figure 4C:
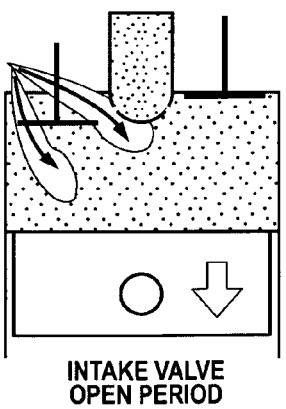
Figure 4D:
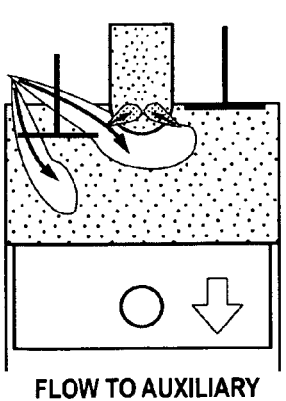

Then, as illustrated in FIG. 4(c), when intake valve 7 is subsequently opened (that is, after the EVC timing of exhaust valve 8 and the TDC timing of piston 3 on the exhaust stroke), fresh air rushes into main combustion chamber 4 through intake valve 7 as a result of the pressure differential created by the movement of piston 3. As the fresh air rushes in, the pressure in main combustion chamber 4 increases and an opposite pressure differential (i.e., as compared to the pressure differential prior to the IVO timing of intake valve 7) is produced between main combustion chamber 4 and auxiliary combustion chamber 12. Consequently, as illustrated in FIG. 4(d), some of the fresh air flows from main combustion chamber 4 to auxiliary combustion chamber 12.

The fresh air that flows into auxiliary combustion chamber 12 is mixed with some of the residual gas that had previously been drawn out of auxiliary combustion chamber 12, and forms a "working mixture." However, the working mixture flowing back into auxiliary combustion chamber 12 has a lower percentage of the residual gas (and a corresponding higher percentage of fresh air). That is to say, as a result of the IVO retardation operation mode, residual gas in auxiliary combustion chamber 12 is diluted by fresh air. Accordingly, ease of ignition in auxiliary combustion chamber 12 is improved, the torch flame jetted from auxiliary combustion chamber 12 to main combustion chamber 4 after the ignition is strengthened (and/or the jet speed of the torch flame is increased), and more stabile combustion is achieved. Thus, an operation with a much leaner A/F ratio becomes possible.

The IVO retardation operation mode occurs during a period following the TDC timing of piston 3 on the exhaust stroke, and during which both intake valve 7 and exhaust valve 8 are kept closed. During this period of the IVO retardation operation mode, the residual gas in main combustion chamber 4 is expanded so as to reduce the pressure in main combustion chamber 4 and to produce a first pressure differential across communicating passages 13a, i.e., between main combustion chamber 4 (relatively lower pressure) and auxiliary combustion chamber 12 (relatively higher pressure). The residual gas that is from a previous cycle and that is in auxiliary combustion chamber 12 is drawn into main combustion chamber 4 via communicating passages 13a through partition wall 13, and the first pressure differential is reduced, i.e., the pressure in auxiliary combustion chamber 12 is reduced, while the pressure in main combustion chamber 4 is increased. When the IVO timing of intake valve 7 occurs, i.e., after being retarded by the IVO retardation operation mode, fresh air rushes into and dilutes the residual gas in main combustion chamber 4. The inflow of fresh air also increases the pressure in main combustion chamber 4 and produces a second pressure differential across communicating passages 13a, i.e., between main combustion chamber 4 (relatively higher pressure) and auxiliary combustion chamber 12 (relatively lower pressure). The second pressure differential causes a working mixture of the residual gas and fresh air to rush into auxiliary combustion chamber 12 via communicating passages 13a through partition wall 13. The percentage of the residual gas in the working mixture that flows into auxiliary combustion chamber 12 is reduced by the corresponding percentage of fresh air, and the amount of the residual gas in auxiliary combustion chamber 12 is therefore less than when auxiliary combustion chamber 12 contained only the residual gas. Thus, as compared with related engines, the amount of residual gas in the auxiliary combustion chamber at the time of ignition is reduced, ignition is facilitated, and stable combustion is achieved.

It is preferable to inject fuel to a position near communicating passages 13a when the second pressure differential exists and the working mixture flows into auxiliary combustion chamber 12. With the injection occurring at such timing, as will be described hereinafter, it is possible to adjust the concentration of the A/F mixture in auxiliary combustion chamber 12, taking into account that the A/F mixture in auxiliary combustion chamber 12 is made leaner on the compression stroke of piston 3, and to still provide a suitable A/F mixture for ignition and combustion. Preferably, fuel injection valve 14a is disposed such that a part of the fuel spray is directed toward communicating passages 13a, and at least part of the fuel is injected and supplied during a period from near the IVO timing to the point when the pressure in main combustion chamber 4 is nearly equalized with the pressure in intake port 5. The residual gas is drawn out of auxiliary combustion chamber 12 and almost all of the residual gas is replaced with fresh air and fuel. Accordingly, the residual gas in auxiliary combustion chamber 12 is reduced and the A/F mixture in main combustion chamber 4 and auxiliary combustion chamber 12 is made richer to further improve ease of ignition and to achieve combustion stability.

Figure 4E:
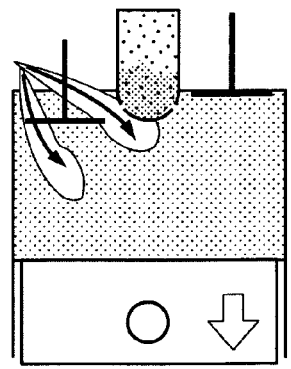

In the latter half of the intake stroke, as the second pressure differential disappears, i.e., as the pressure in main combustion chamber 4 equalizes with the pressure in auxiliary combustion chamber 12, the flow between main combustion chamber 4 and auxiliary combustion chamber 12 disappears. As illustrated in FIG. 4(e), the fresh air continues to flow into main combustion chamber 4 from intake port 5 and, until intake valve 7 is closed, there is no specific flow pattern between main combustion chamber 4 and auxiliary combustion chamber 12.

Figure 4F:
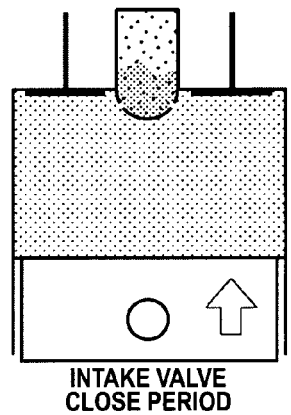
Figure 4G:
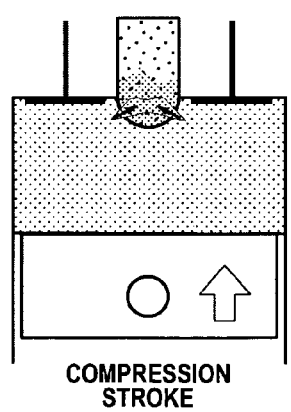
Figure 4H:
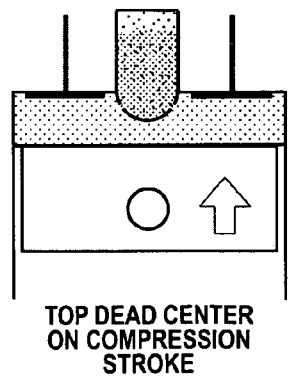

As illustrated in FIG. 4(f), after intake valve 7 closes, the pressure in main combustion chamber 4 increases during the compression stroke of piston 3. As the pressure increases in main combustion chamber 4, a third pressure differential is produced between main combustion chamber 4 (relatively higher pressure) and auxiliary combustion chamber 12 (relatively lower pressure), and the working mixture in main combustion chamber 4 flows into auxiliary combustion chamber 12, as illustrated in FIG. 4(g). At the intake valve closing ("IVC") timing, the mixture in auxiliary combustion chamber 12 is relatively richer than that in main combustion chamber 4, and due to the flow of the working mixture from main combustion chamber 4 during the compression stroke of piston 3, the mixture in auxiliary combustion chamber 12 becomes increasingly diluted as illustrated in FIG. 4(h).

Figure 5:
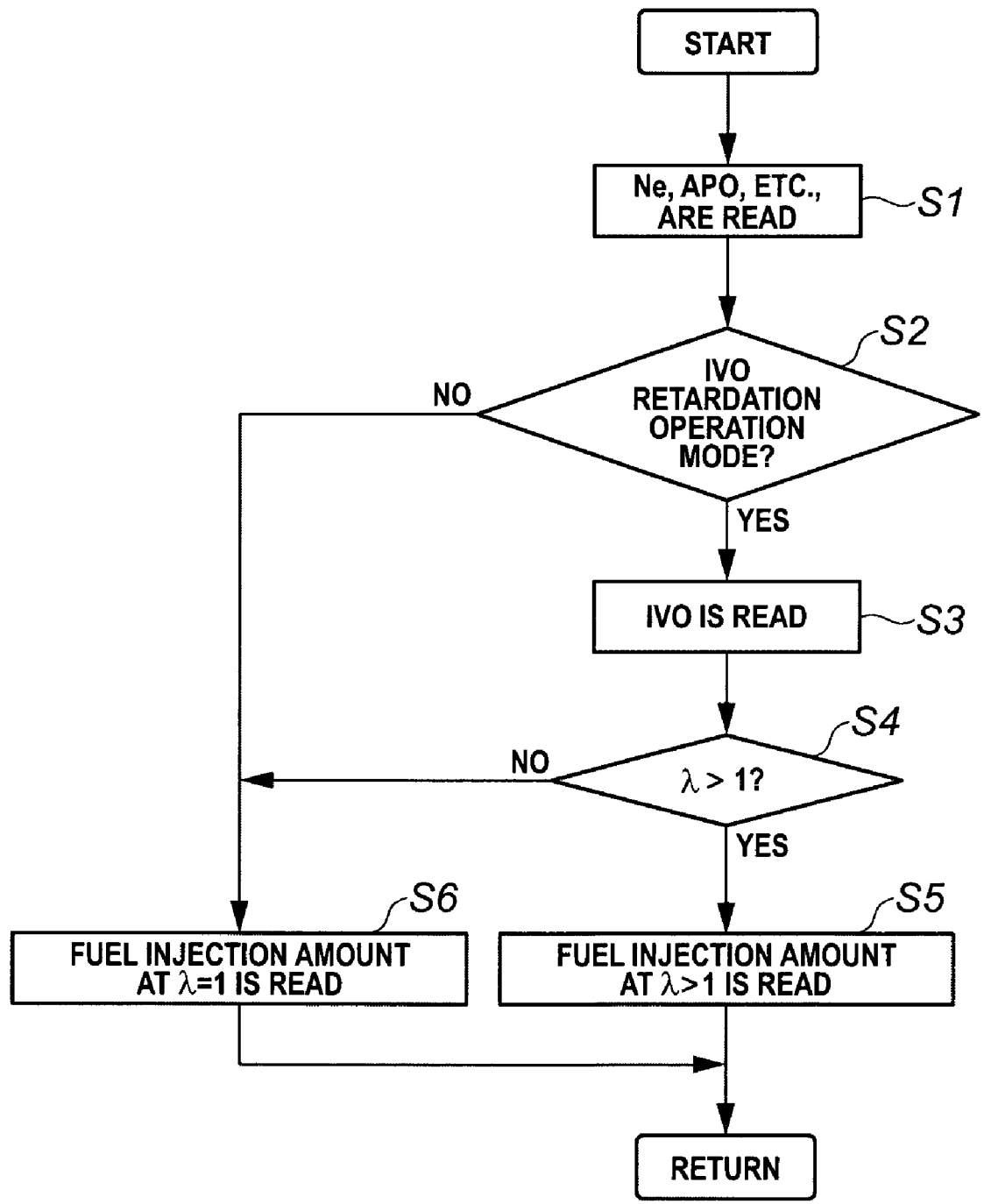
FIG. 5 is a flowchart explaining the operation of the internal combustion engine described with respect to FIG. 1.

FIG. 5 is a flowchart of an operation in accordance with the ICE shown in and described in connection with FIGS. 1-4. The operation steps shown in the flowchart are executed for each predetermined calculation period. At step S1, the engine rotation speed Ne detected by crank angle sensor 27, the accelerator open degree APO detected by accelerator pedal sensor 26, the vehicle speed detected by a vehicle speed sensor 33, and other information are read; and, based on these detected values, an engine operation condition, such as the load on the engine, is calculated by using any known method. At step S2, a decision is made, based on the calculated engine operation condition, as to whether or not the calculated engine operation condition is appropriate for implementing the IVO retardation operation mode. If NO at step S2, i.e., if the calculated engine operation condition is not appropriate for implementing the IVO retardation operation mode, the operation goes to step S6 to set a fuel injection amount and then returns to the start of the flowchart. If YES at step S2, i.e., if the calculated engine operation condition is suitable for implementing the IVO retardation operation mode, the IVO timing is looked up from a stored data map that is provided, for example, by experimentation, and at step S5 a fuel injection amount consistent for operation with a lean A/F ratio is set and the process then returns to the start of the flowchart.

Figure 6:
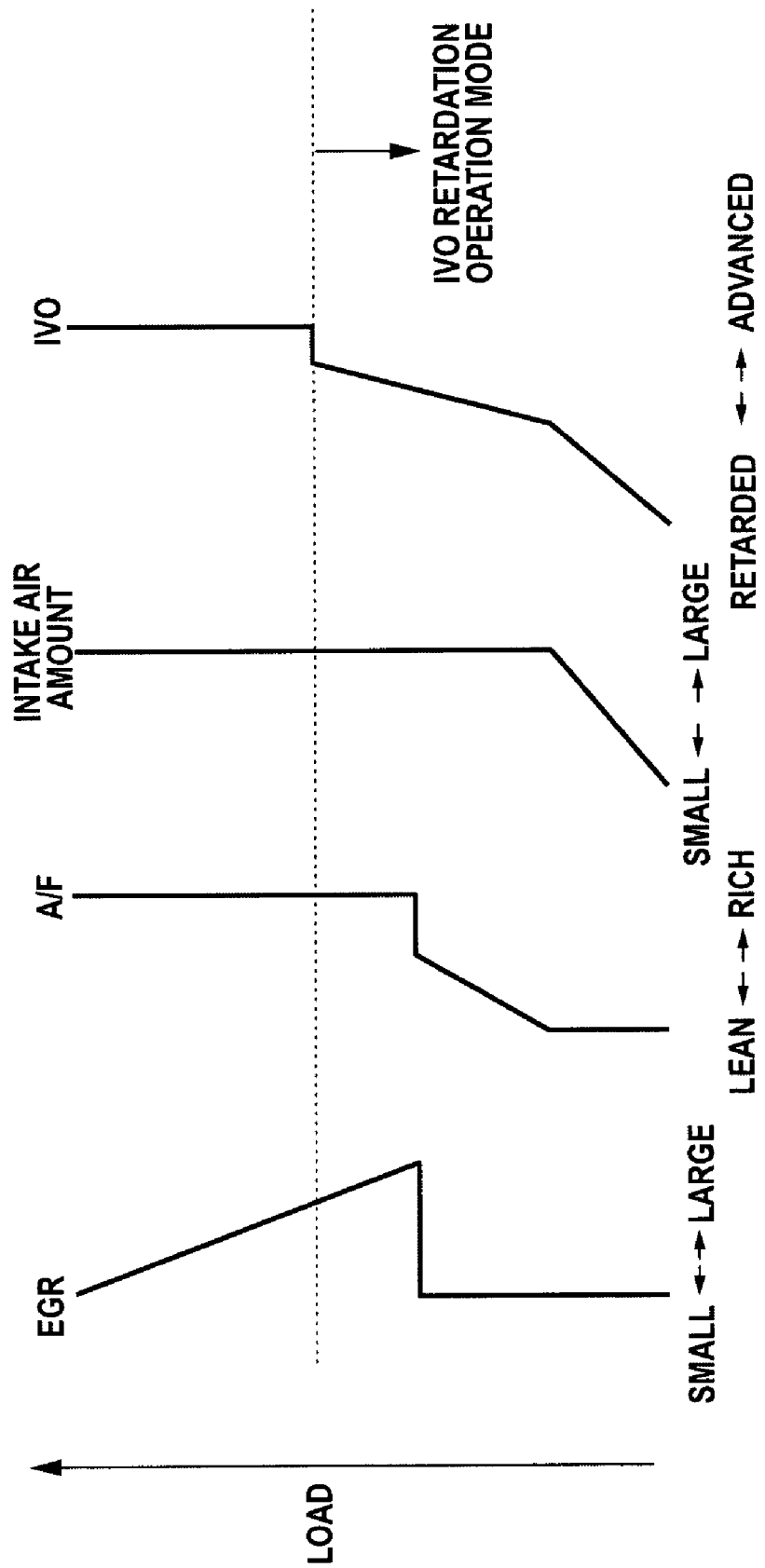
FIG. 6 illustrates a relationship between exhaust gas recirculation control, air/fuel ratio, intake air amount, and intake valve open timing in the internal combustion engine shown in FIG. 1(a).

FIG. 6 shows a chart that illustrates preferred relationships for the control of the EGR, the A/F mixture, the intake air amount, and the IVO timing. In a high-load range, the ICE is preferably operated with a stoichiometric A/F ratio without EGR. From a high-load range to a middle-load range, the EGR is gradually introduced, i.e., the amount of EGR supplied to the intake system is gradually increased, until the rate of EGR introduction becomes greater than a predetermined rate. The IVO retardation operation mode is started when the EGR supply rate reaches the predetermined rate, and the degree of the IVO retardation increases as the EGR supply rate increases. As the EGR supply rate increases, combustion tends to become unstable. Thus, implementing the IVO retardation operation mode in the high-load to middle-load range is primarily for enhancing the residual gas reduction in auxiliary combustion chamber 12 and for enriching the combustible A/F mixture.

In a low-load range, the IVO retardation operation mode continues to be implemented during lean operation, i.e., operation with a lean A/F mixture. The degree of retardation increases as the A/F mixture becomes leaner, i.e., as the supplied A/F mixture becomes leaner. At a certain point, the amount of air is reduced for lowering the load, and the pressure in intake port 5 is lowered. Concurrently, the IVO timing is further retarded (that is, the number of degrees of retardation is increased as the amount of air decreases). As was described above in connection with increasing the EGR supply rate, the combustion also becomes unstable as the load on the engine decreases or as the A/F mixture supplied to the ICE becomes leaner.

Figure 7:
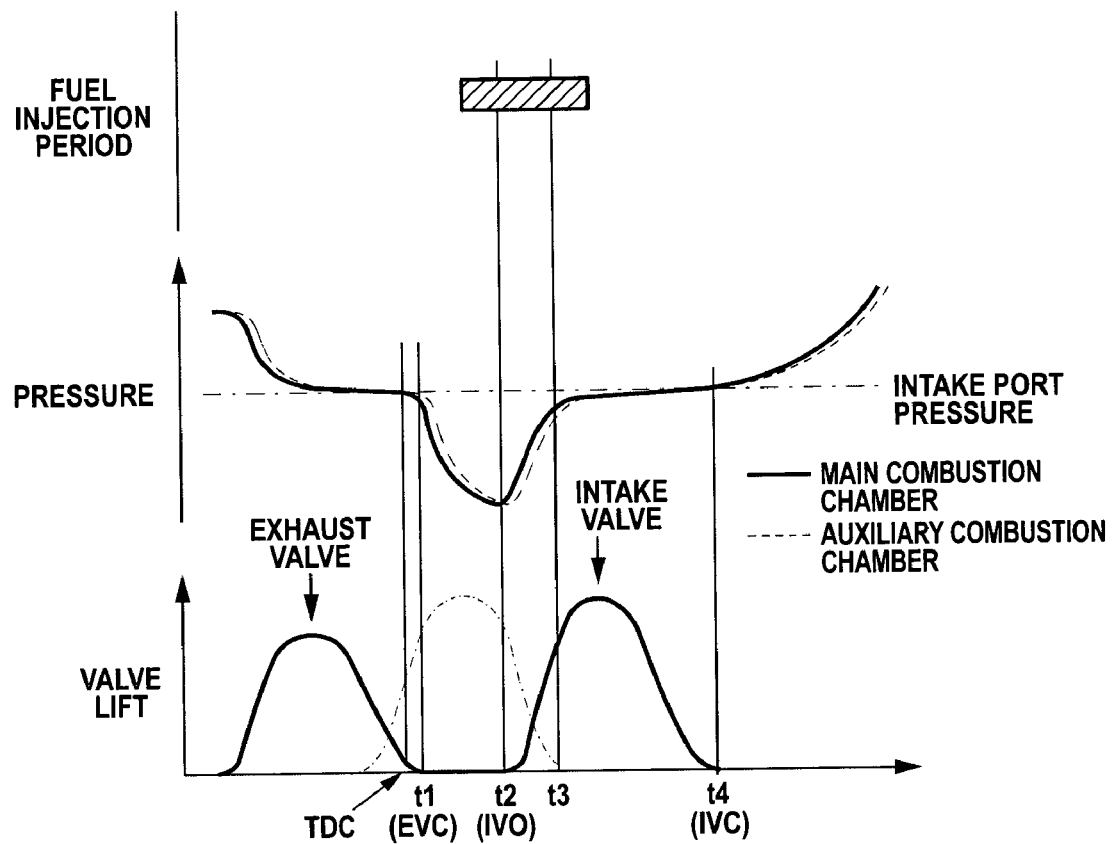
FIG. 7 is a timing chart explaining retardation of the intake valve open timing in the internal combustion engine shown in FIG. 1(a).

In related engines that do not include an IVO retardation operation mode, the open period of the intake valve extends from a time just before the piston top dead center timing on an exhaust stroke to a time just after the piston bottom dead center timing on an intake stroke, as is indicated by a chain-dot line shown in FIG. 7. However, in an ICE with the IVO retardation operation mode, the EVC timing of exhaust valve 8 occurs slightly after the TDC of piston 3 on the exhaust stroke (time t1). Thereafter, the stroke of piston 3 changes from the exhaust stroke to the intake stroke, and the volume of main combustion chamber 4 gradually increases and the pressure in main combustion chamber 4 gradually decreases. As a result, a first pressure differential is produced between main combustion chamber 4 and auxiliary combustion chamber 12 (i.e., the pressure in main combustion chamber 4 is less than the pressure in auxiliary combustion chamber 12), and residual gas flows from auxiliary combustion chamber 12 to main combustion chamber 4. The first pressure differential is illustrated in FIG. 7 by a lag between the pressure drop in main combustion chamber 4 (shown in solid line) and the pressure drop in auxiliary combustion chamber 12 (shown in broken line).

During the intake stroke of piston 3, intake valve 7 opens (at time t2), and fresh air is drawn into main combustion chamber 4 because the pressure in main combustion chamber 4 has been reduced. Upon IVO, the pressure in main combustion chamber 4 increases, and a second pressure differential is produced between main combustion chamber 4 and auxiliary combustion chamber 12 (i.e., the pressure in main combustion chamber 4 is greater than the pressure in auxiliary combustion chamber 12), and a working mixture of the residual gas and fresh air flows from main combustion chamber 4 to auxiliary combustion chamber 12. The second pressure differential is also illustrated in FIG. 7 by a lag between the pressure drop in main combustion chamber 4 (shown in solid line) and the pressure drop in auxiliary combustion chamber 12 (shown in broken line). The first pressure differential occurs before time t2 and the second pressure differential occurs after time t2.

Thereafter, at time t3, the second pressure differential between main combustion chamber 4 and auxiliary combustion chamber 12 begins to disappear, i.e., the pressures begin to equalize in main combustion chamber 4 and auxiliary combustion chamber 12, and flow between these chambers almost disappears (at time t3). However, during the subsequent compression stroke of piston 3, at time t4, the pressure in main combustion chamber 4 increases and there is produced a third pressure differential between main combustion chamber 4 and auxiliary combustion chamber 12 (i.e., the pressure in main combustion chamber 4 is greater than the pressure in auxiliary combustion chamber 4). Due to the third pressure differential, the working mixture flows from main combustion chamber 4 to auxiliary combustion chamber 12. The third pressure differential is also illustrated in FIG. 7 by a lag between the pressure drop in main combustion chamber 4 (shown in solid line) and the pressure drop in auxiliary combustion chamber 12 (shown in broken line). The third pressure differential occurs after time t4.

By implementing the IVO retardation operation mode, since the IVO timing of intake valve 7 is retarded relative to both the EVC timing of exhaust valve 8 and the TDC timing of piston 3 on exhaust stroke, the above-mentioned first, second, and third pressure differentials are produced between main combustion chamber 4 and auxiliary combustion chamber 12. By virtue of the first, second, and third pressure differentials, the residual gas in auxiliary combustion chamber 12 is reduced, ignition is facilitated, and combustion stability is improved. Thus, ICE operation with a much leaner A/F mixture and/or an increased supply of EGR is possible.

By injecting fuel near communicating passages 13a during a pressure increasing period after opening intake valve 7 (from time t2 to time t3), a more concentrated A/F mixture is provided to auxiliary combustion chamber 12. Thus, ignition is facilitated and combustion stability is further improved.

By providing an ICE with the IVO retardation operation mode, at least the following advantages are obtained.

The IVO retardation operation mode retards the IVO timing relative to both the EVC timing and the TDC timing of piston 3 on the exhaust stroke such that the residual gas is reduced in auxiliary combustion chamber 12 at the time of ignition, and the concentration of the A/F mixture in auxiliary combustion chamber 12 is increased. Thus, ignition is facilitated and a torch jet is hastened and/or strengthened, so that stable combustion is achieved.

Implementing the IVO retardation operation mode in an ICE operating range wherein the engine load is lower than a predetermined value reduces the residual gas in auxiliary combustion chamber 12. Moreover, stable combustion is also achieved. Furthermore, when implementing the IVO retardation operation mode in a lean operation condition, e.g., wherein the A/F mixture fed to the engine becomes lean, or in a condition wherein the EGR supply to the ICE is greater than a predetermined rate, stable combustion may nevertheless be achieved.

Increasing the retardation degree of the IVO timing as 1) the ICE load becomes small, 2) the supplied A/F mixture becomes lean, or 3) the EGR supply increases, reduces pressure in main combustion chamber 4. Thus, a large amount of residual gas in auxiliary combustion chamber 12 may be replaced with fresh air. Accordingly, stable combustion becomes possible even with a much lower load, with a much leaner A/F mixture, or with a much increased EGR supply.

Injecting fuel during the period of increasing cylinder pressure that occurs after opening of the intake valve enables fresh air and fuel to flow to auxiliary combustion chamber 12. That is, the residual gas may be replaced with fresh air and fuel. Thus, ignition is facilitated and the stability of combustion is improved. In particular, directing a part of the injected fuel spray toward communicating passages 13a can ensure a flow of fresh air and fuel to auxiliary combustion chamber 12.

Figure 8A:
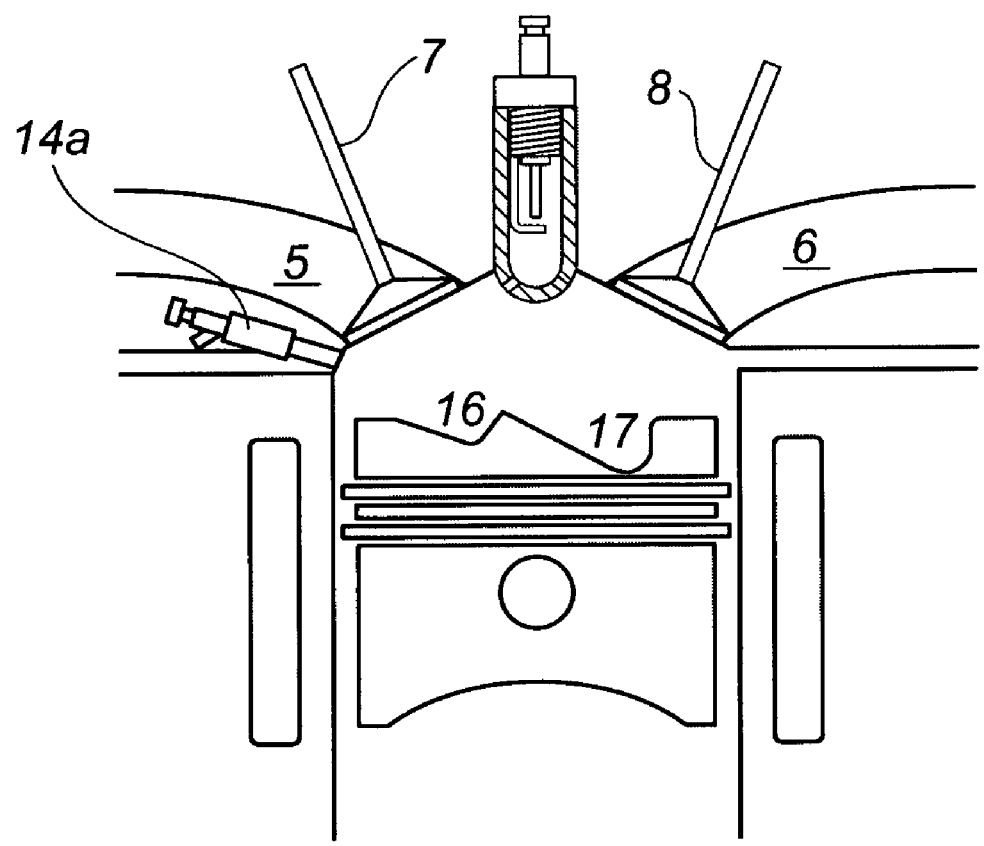
FIG. 8(a) is a schematic illustration showing another construction of an internal combustion engine including an auxiliary combustion chamber.
Figure 8B:
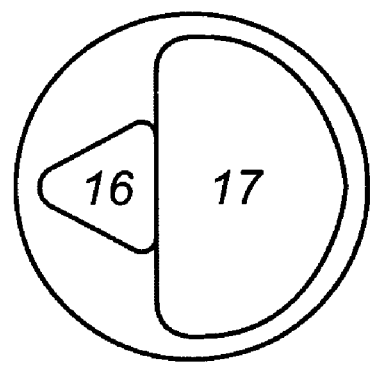
FIG. 8(b) is a top view of a piston crown in the internal combustion engine shown in FIG. 8(a).
Figure 9A:
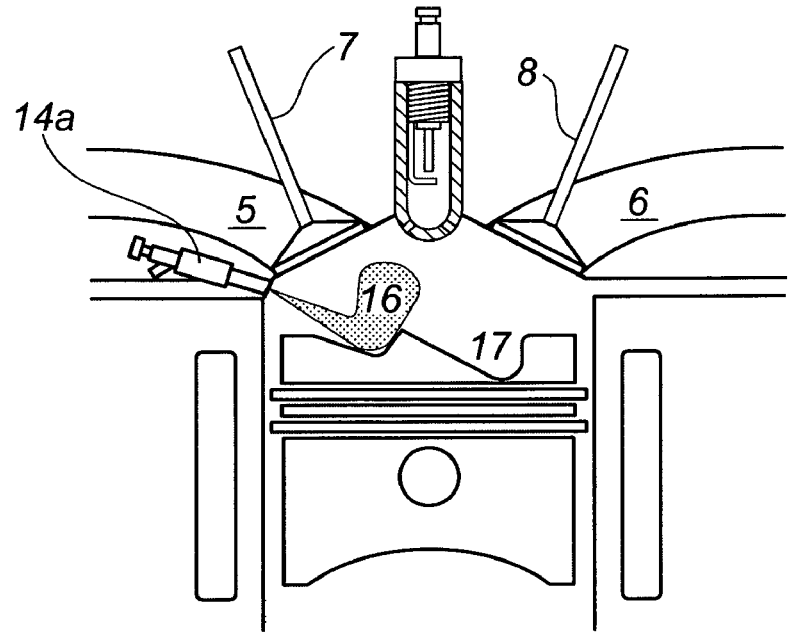
FIGS. 9(a) and 9(b) are schematic illustrations explaining a first fuel injection spray and a second fuel injection spray in the internal combustion engine shown in FIG. 8(a).
Figure 9B:
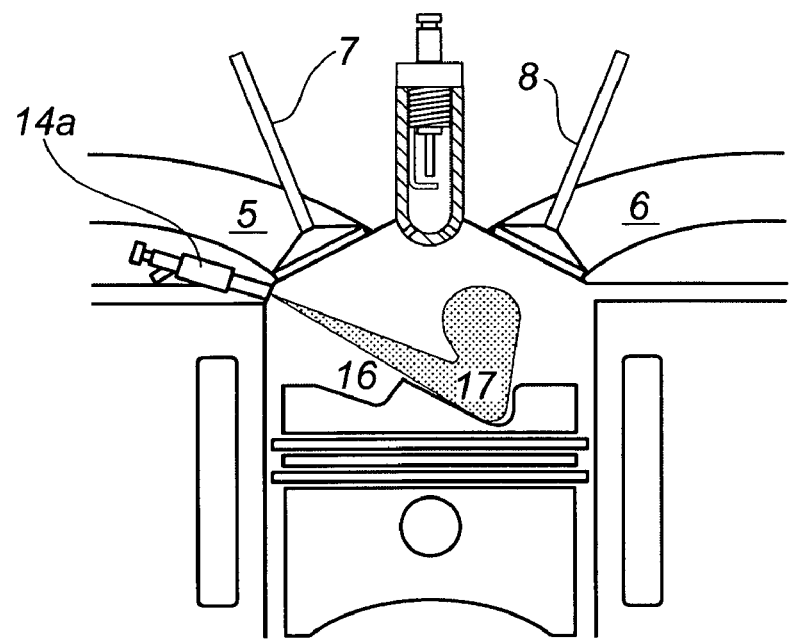

An ICE as shown in FIGS. 8(a) and 8(b) will now be described. There are numerous similarities between the ICE shown in FIG. 8(a) and the ICE shown in FIG. 1(a); however, for ease of explanation, only the differences will be described hereinafter. As shown in FIGS. 8(a) and 8(b), a crown top surface of a piston is formed with a first cavity 16 and a second cavity 17. First cavity 16 receives a first fuel spray produced by a first fuel injection and redirects the first fuel spray toward communicating passages 13a. Second cavity 17 receives a second fuel spray produced by a second fuel injection during the compression stroke so as to provide a stratified charge during combustion. As it is used herein, "stratified charge" refers to layering of the A/F mixture inside a cylinder. FIG. 9(a) illustrates the first fuel spray of the first fuel injection being redirected by the first cavity 16 toward the communicating passages 13a. FIG. 9(b) illustrates the second fuel spray of the second fuel injection providing a stratified charge. According to the arrangement illustrated in FIGS. 8(a) and 9(a), fuel injection valve 14a is disposed on a side wall such that the first fuel spray is redirected toward communicating passages 13a (or auxiliary combustion chamber 12) with the aid of first cavity 16 formed on the crown top surface of the piston, as is desirable during the IVO retardation operation mode.

Figure 11:
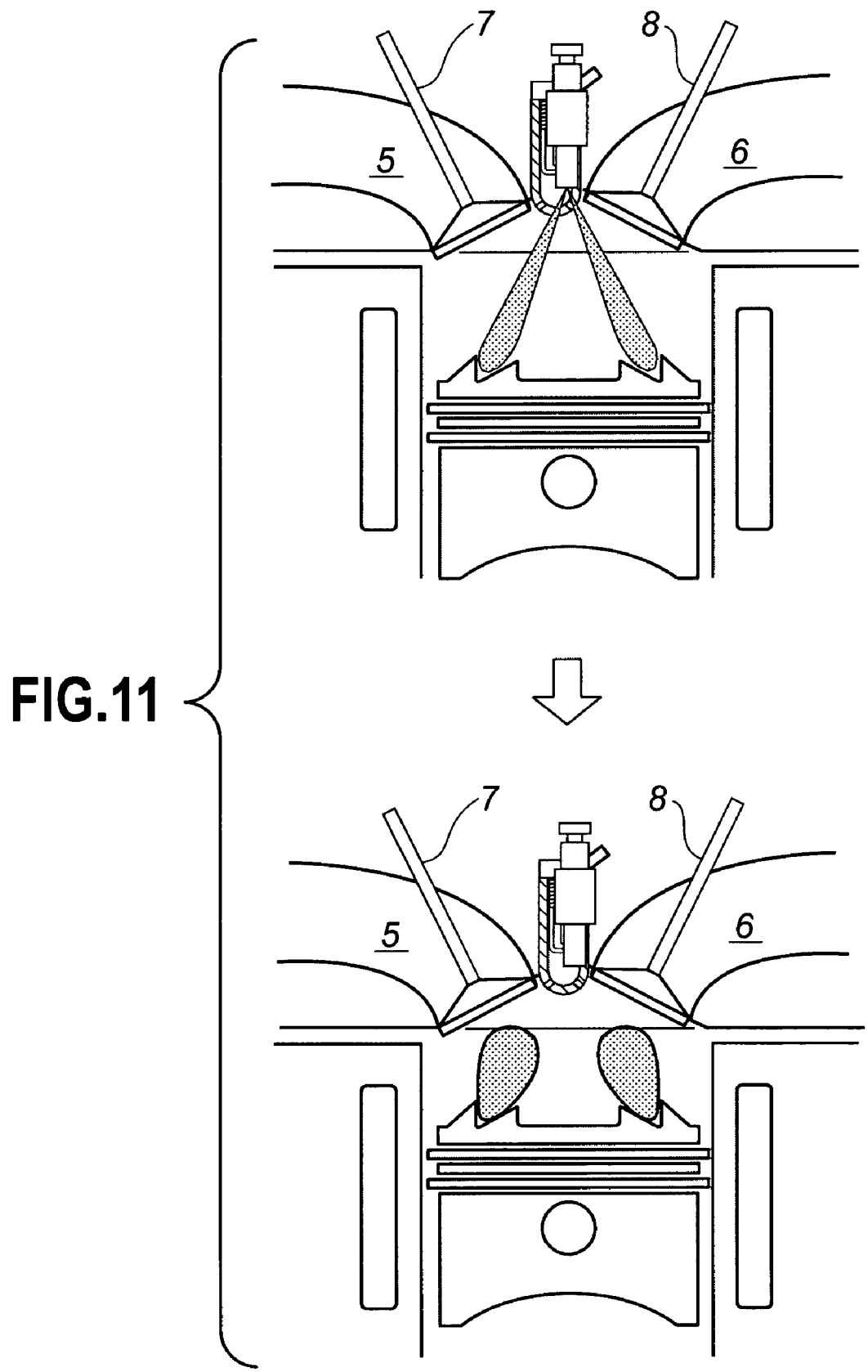
FIG. 11 is a schematic illustration explaining a second fuel injection spray during a compression stroke in the modified internal combustion engine shown in FIG. 10(a).
Figure 12:
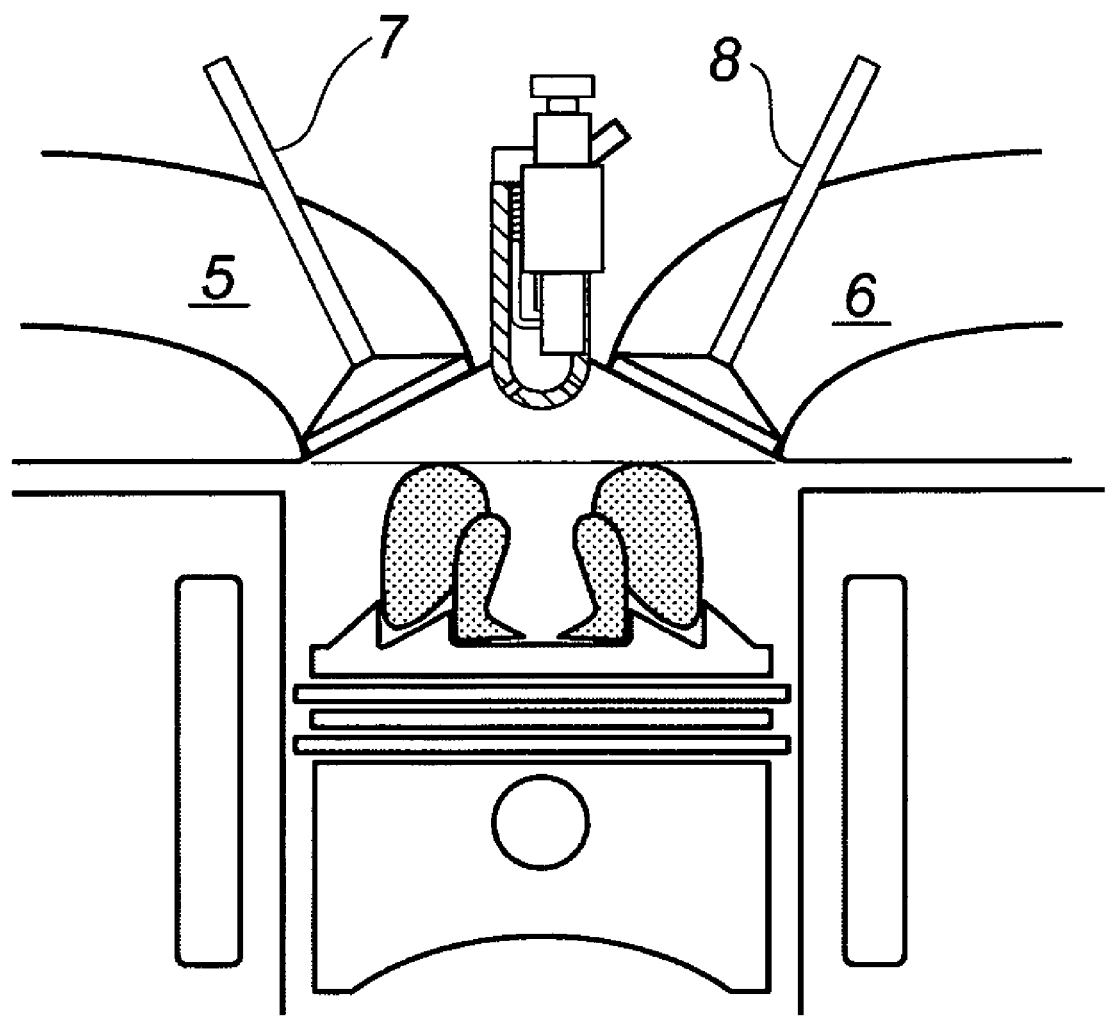
FIG. 12 is a schematic illustration explaining a second fuel injection spray having a long period in the modified internal combustion engine shown in FIG. 10(a).

Other constructions and arrangements are also envisioned. In such constructions and arrangements, preferably the piston crown top surface is formed with a plurality of cavities wherein at least one cavity receives a fuel spray produced by a first fuel injection carried out during the IVO retardation operation mode and redirects the fuel spray toward communicating passages 13a, and another cavity receives a fuel spray produced by a second fuel injection so as to provide a stratified charge in main combustion chamber 4. For example, as illustrated in FIGS. 10(a), 10(b), and 11, a fuel injection valve 14a may be disposed just above main combustion chamber 4, and a piston crown top surface is formed with inner and outer concentric cavities. As shown in FIGS. 10(a) and 10(b), during the IVO retardation operation mode, the first fuel injection sprays fuel toward the inner cavity (which corresponds to first cavity 16 in FIG. 9(a)) during the intake stroke. As shown in FIG. 11, the second fuel injection, i.e., which provides a stratified charge, sprays fuel toward the outer cavity (which corresponds to second cavity 17 in FIG. 9(b)) during the compression stroke. With such arrangement, much homogenized air/fuel mixture is advantageously produced in main combustion chamber 4. If, as illustrated in FIG. 12, the period of the second fuel injection is long, the fuel spray is initially redirected by the outer cavity to provide a stratified charge and is subsequently redirected by the inner cavity toward communicating passages 13a. However, this phenomenon does not induce any drawback.

Figure 13:
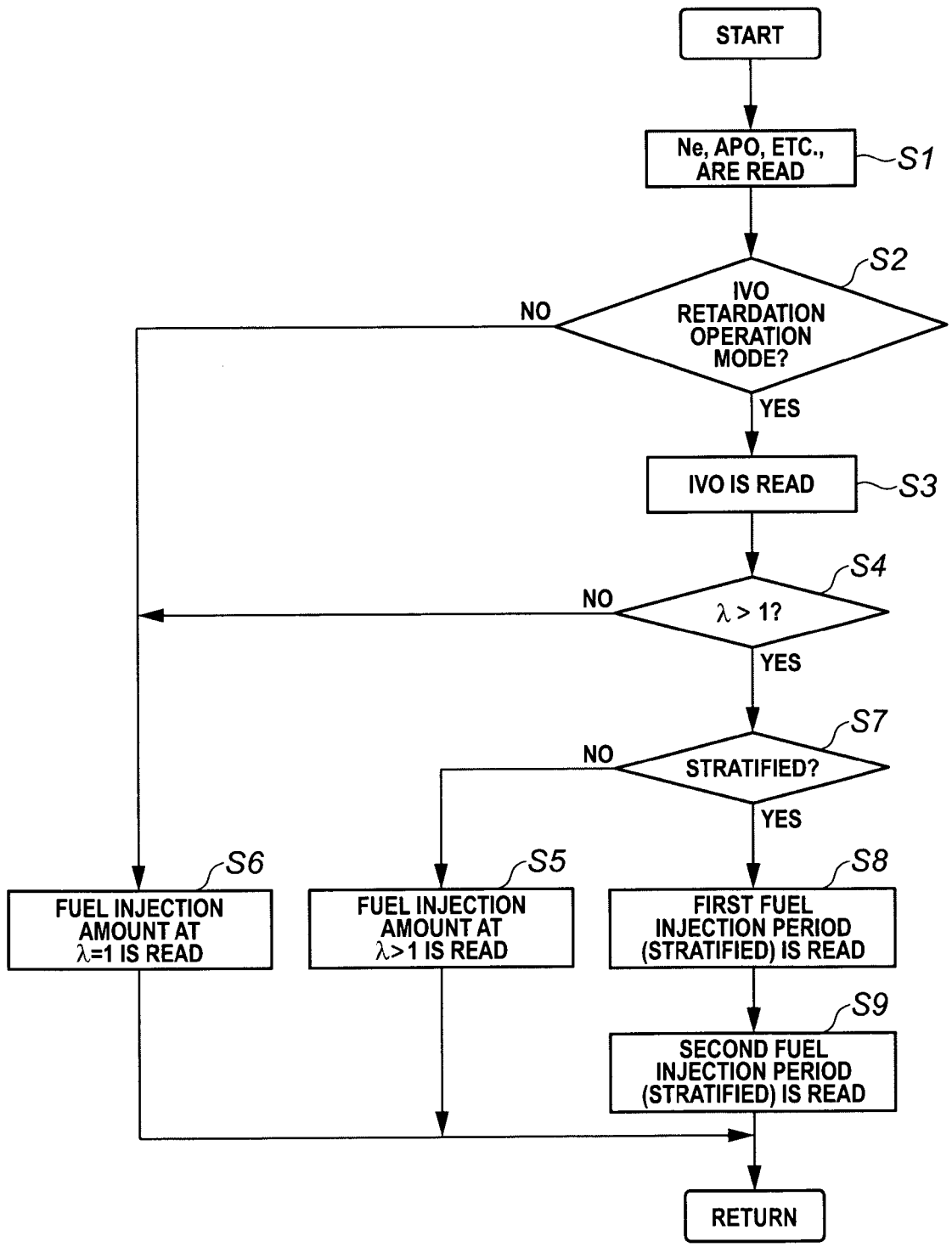
FIG. 13 is a flowchart explaining the operation of the internal combustion engine described with respect to FIG. 8(a).

FIG. 13 is a flowchart of an operation in accordance with the ICE shown in and described in connection with FIGS. 8-12. Since operation steps of this flowchart are similar to those shown in FIG. 5, only those steps that are different will be described in the following. At step S7, a decision is made as to whether or not stratified charge combustion is appropriate for the current operation condition. If YES, i.e., if it is determined that the current operation range is appropriate for stratified charge combustion, the operation flow proceeds to steps S8 and S9 to respectively set first and second fuel injection amounts, and to carry out fuel injection for effecting stratified charge combustion.

Figure 14:
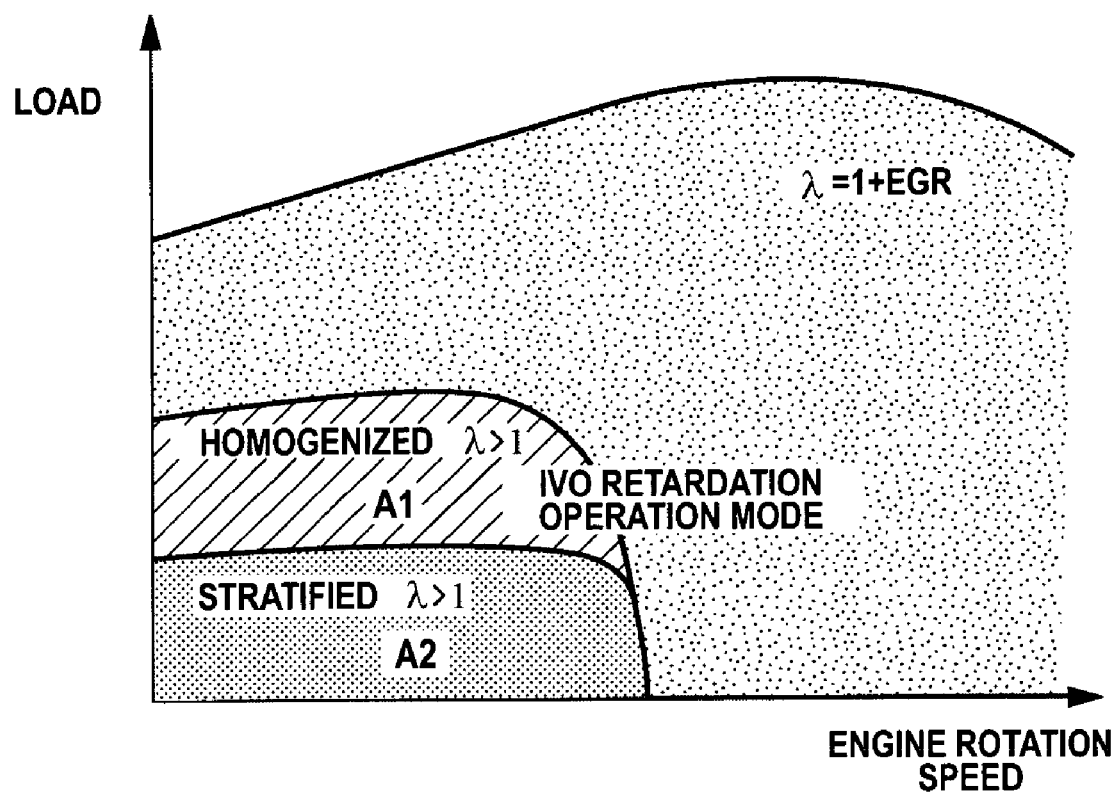
FIG. 14 is an operation map used in the internal combustion engine shown in FIG. 8(a).

FIG. 14 shows an operation map for the ICE shown in and described in connection with FIGS. 8-13. Similar to region A in FIG. 3, lean operation of an ICE at low-speed and in a low-load range is carried out with the IVO retardation operation mode. However, the low-speed, low-load range in FIG. 14 is separated into a relatively high-load region A1, wherein fuel injection during the intake stroke provides a homogenous charge for combustion, and a relatively low-load region A2, wherein a first fuel injection occurs during the intake stroke in connection with the IVO retardation operation mode and an additional second fuel injection occurs during the subsequent compression stroke to provide a stratified charge for combustion.

Figure 15:
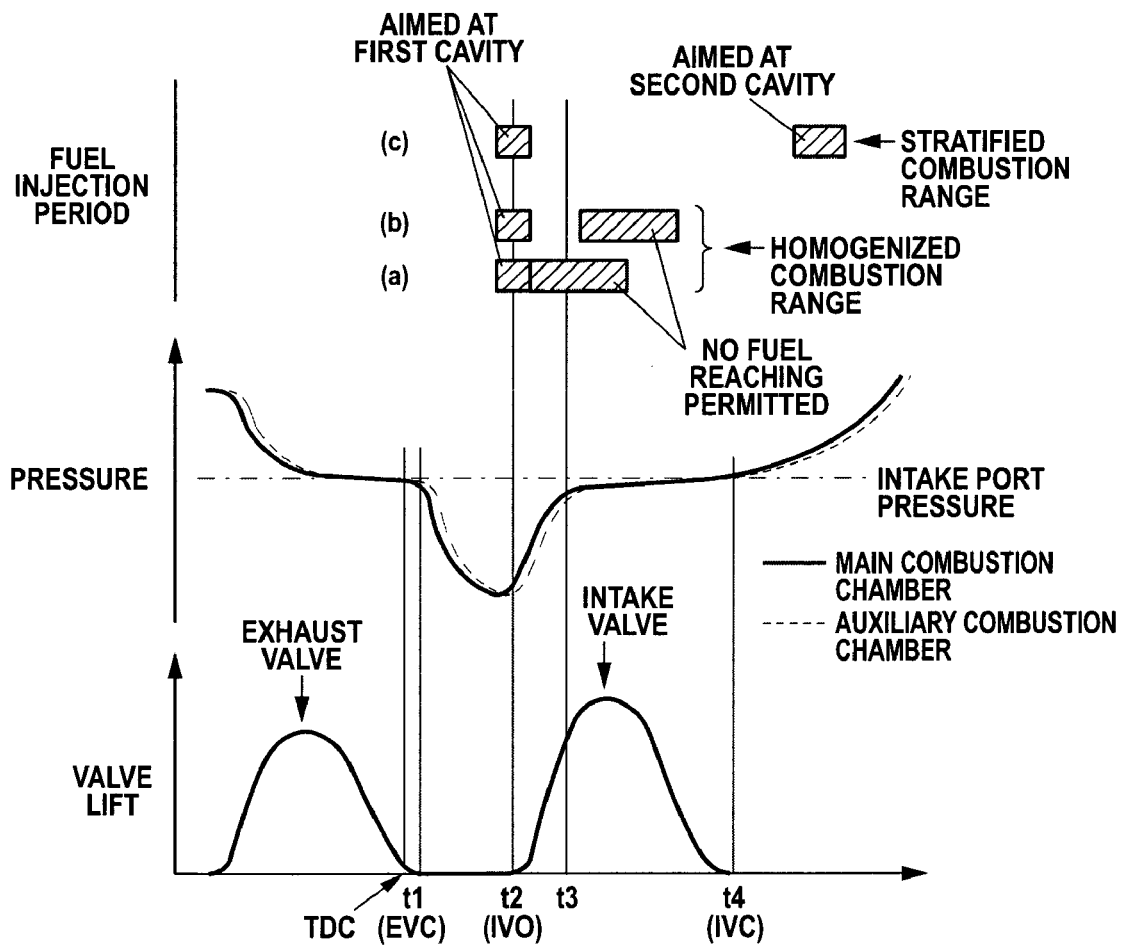
FIG. 15 is a timing chart explaining retardation of the intake valve open timing and fuel injection timing in the internal combustion engine shown in FIG. 8(a).

FIG. 15 is a timing chart explaining the IVO retardation operation mode for the ICE shown in and described in connection with FIGS. 8-14. In homogenized combustion range A1, timing of the first fuel injection during the intake stroke corresponds to the first fuel spray being received and redirected by the first cavity. However, when the ICE is operating in the homogenized combustion range A1, it is not necessary for the first fuel injection to inject all of the fuel that is to be supplied in one cycle. That is, only the part of the fuel injected by the first fuel injection may be directed to the first cavity with the second fuel injection occurring immediately after the first fuel injection (see fuel injection period "a" in FIG. 15). Or, the occurrence of the second fuel injection may be delayed to between time t3 and time t4, i.e., after the pressure in the main combustion cylinder increases in response to the intake valve opening but before the time when the fuel spray may be directed to the second cavity (see fuel injection period "b" in FIG. 15).

When the ICE is operating in the stratified combustion range A2, timing of the first fuel injection during the intake stroke corresponds to the first fuel spray being received and redirected by the first cavity, and timing of the second fuel injection during the compression stroke corresponds to the second fuel spray being received and redirected by the second cavity (see fuel injection period "c" in FIG. 15).

If the fuel that is supplied in each cycle is divided between the first and second fuel injections, it is preferable that the amount of fuel injected by the first fuel injection is at least sufficient to avoid poor combustion stability when the engine load is decreased, when the A/F mixture fed to the ICE becomes lean, and/or when the EGR supply is increased (in the case that EGR is being used). By increasing the amount of injected fuel during the first fuel injection, the fuel flow into auxiliary combustion chamber 12 increases while the pressure in the main combustion cylinder increases in response to the intake valve opening. Thus, the A/F mixture in auxiliary combustion chamber 12 becomes enriched (as does the A/F mixture in main combustion chamber 4), which eases ignition and improves combustion stability.

In accordance with the fuel injection described above, the fuel injected by the first fuel injection flows into auxiliary combustion chamber 12 and is ignited in auxiliary combustion chamber 12 to produce a torch flame that jets toward main combustion chamber 4 to ignite and combust the stratified A/F mixture that has been produced in main combustion chamber 4 by the second fuel injection.

FIG. 16 shows a chart that illustrates preferred relationships for the control of the EGR, the A/F mixture, the intake air amount, and the IVO timing for the ICE shown in and described in connection with FIGS. 8-15. In both stratified combustion range A2 and homogenized combustion range A1, by increasing the retardation degree of the IVO timing as the engine load decreases, the residual gas in auxiliary combustion chamber 12 is reduced and the supply of fuel in auxiliary combustion chamber 12 is increased.

As for the relationship between A/F mixture and IVO timing, it is believed that at the point when a switch is made from homogenized combustion range A1 to stratified combustion range A2, the A/F mixture at the high-load end of stratified combustion range A2 would be richer than the A/F mixture at the low-load end of homogenized combustion range A1. For this reason, as shown in FIG. 14, at the time the switch is made from homogenized combustion range A1 to stratified combustion range A2, the IVO timing is advanced such that the A/F mixture at the high-load end of stratified combustion range A2 approximates the A/F mixture at the low-load end of homogenized combustion range A1, and such that there is a smooth transition between ranges A1 and A2.

In addition to the achievements provided by the ICE described in connection with FIGS. 1-7, the ICE shown in and described in connection with FIGS. 8-16 also provides the following achievements.

The first fuel injection occurs during the cylinder pressure increasing period. That is, when the pressure in the main combustion cylinder increases in response to the intake valve opening, and after completion of the first fuel injection, the second fuel injection supplies the remainder of the fuel needed in one cycle. Thus, by controlling the amount of fuel injected by the first fuel injection, the amount of fuel flow into auxiliary combustion chamber 12 and the A/F mixture in auxiliary combustion chamber 12 can be controlled. Moreover, the mixture in auxiliary combustion chamber 12 is suitably provided for ease of ignition and stability of combustion. Further, stratified charge combustion can be provided when the second fuel injection occurs during the compression stroke.

Preferably, the piston crown top surface is formed with cavity 16 for receiving the first fuel spray of the first fuel injection and for redirecting the first fuel spray to a position near communicating passages 13a. As such, the piston crown top surface promotes vaporization of fuel and improves the combustion in auxiliary combustion chamber 12.

Also, preferably the piston crown top surface is also formed with cavity 17 for receiving only the second fuel spray of the second fuel injection and, by virtue of the piston movement between the first fuel injection and the second fuel injection, the second fuel spray provides a stratified charge and stable combustion.

Moreover, preferably the fuel amount injected by the first fuel injection (as a portion of the entire amount of fuel supplied in one cycle) is increased in response to decreasing the engine load, in response to leaning the A/F mixture fed to the engine, and/or as the EGR supply increases. Thus, the amount of fuel flow to auxiliary combustion chamber 12 increases to avoid conditions in which it may be difficult to maintain stable combustion. Accordingly, improved ease of ignition and combustion stability are achieved even when the ICE operates with a much lower load, with a much leaner A/F mixture, or with an increased supply of EGR.

Each ICE shown in and described in connection with FIGS. 1-16 relies on injecting fuel directly into a main combustion chamber. Preferably, residual gas in an auxiliary combustion chamber can also be reduced in an ICE that includes port fuel injection. As it is used herein, "port fuel injection" refers to a type of fuel injection system in which fuel is injected into an intake port upstream of an intake valve.

FIG. 17(a) shows a schematic view of an ICE in which a port fuel injection valve 14b is disposed at intake port 5, i.e., in lieu of fuel injection valve 14a described in connection with FIGS. 1-16. Otherwise, the arrangements of the ICE shown in FIG. 17(a) and the ECU shown in FIG. 17(b) are similar to those described in connection with FIGS. 1-16, and descriptions thereof will not be repeated.

Figure 18:
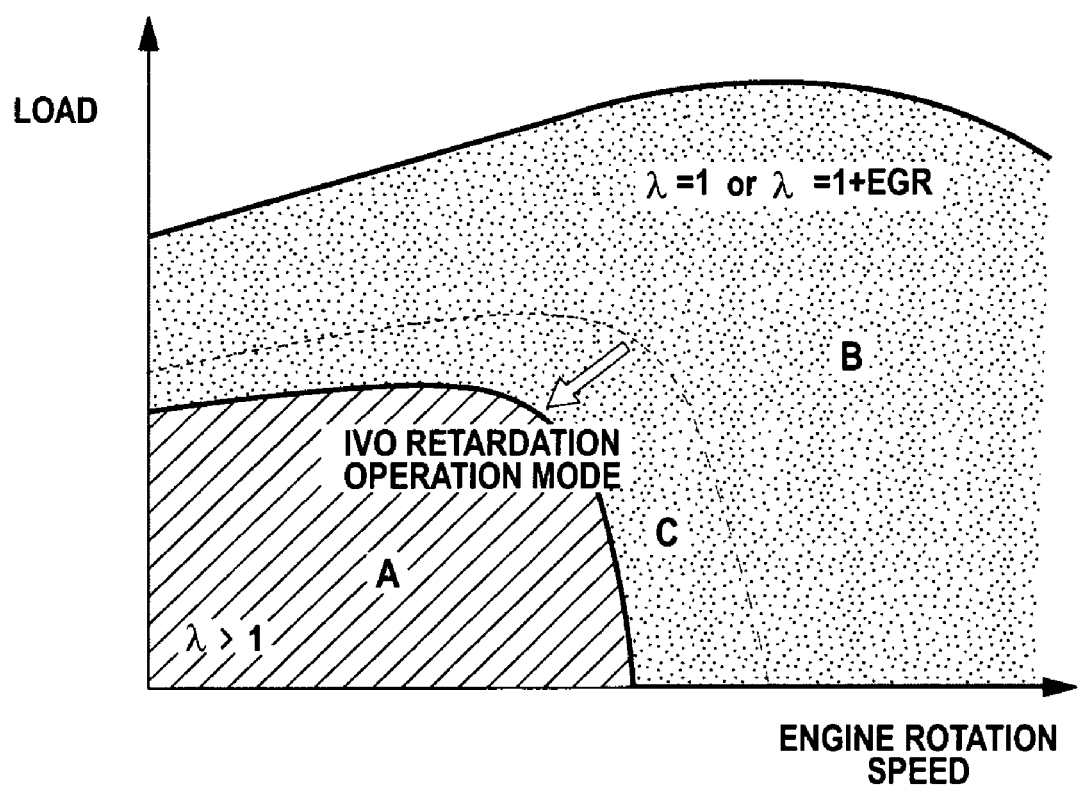
FIG. 18 is an operation map used in the internal combustion engine shown in FIG. 17(a).

FIG. 18 depicts an operation map of the ICE shown in FIG. 17. Similar to the operation map shown in FIG. 3, a region of low-speed, low-load operation is indicated by reference letter A. Region A may be characterized by lean operation (A/F ratio $\lambda$>1). In a range B, the ICE operates with a stoichiometric A/F ratio or operates at the stoichiometric A/F ratio with the addition of EGR. That is to say, the ICE operates at the stoichiometric A/F ratio with only fresh air (i.e., $\lambda$=1), or operates at the stoichiometric A/F ratio with fresh air and with EGR (i.e., [$\lambda$=1]+EGR). Preferably, the IVO retardation operation mode is carried out only in region A (e.g., with lean operation) and in a region C, which is a portion of region B. Region C includes a predetermined low-speed, low-load part of region C in which the ICE operates with the stoichiometric A/F ratio with fresh air or operates at the stoichiometric A/F ratio with fresh air and with EGR.

The IVO retardation operation mode will now be described with reference to FIG. 19. Since the operation is similar to that described above with respect to FIG. 4, the following abbreviated description is provided. Otherwise, the features of FIG. 19 are similar to those shown in FIG. 4, and descriptions thereof will not be repeated.

Figure 19A:
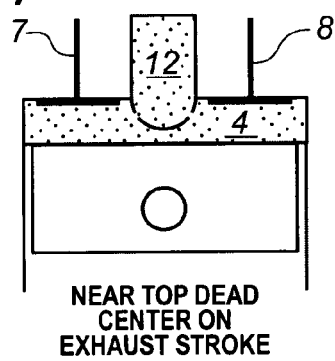
FIGS. 19(a) to 19(h) are schematic illustrations explaining an intake valve opening retardation operating mode employed in the internal combustion engine shown in FIG. 17(a).
Figure 19B:
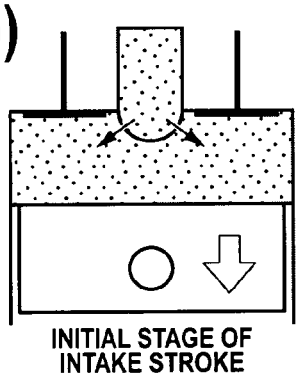
Figure 19C:
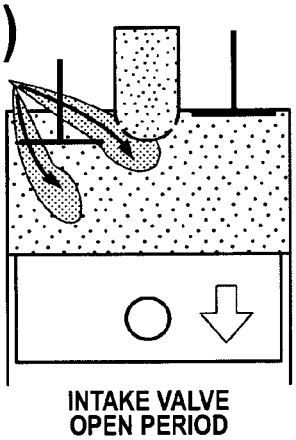

When exhaust valve 8 is closed near the TDC timing of piston 3 on the exhaust stoke, a residual gas produced in a previous cycle is contained in main combustion chamber 4 and auxiliary combustion chamber 12 (see FIG. 19(a)). In an initial stage of the subsequent intake stoke, movement of piston 3 expands the residual gas in main combustion chamber 4, thereby reducing the pressure in main combustion chamber 4. A first pressure differential is produced such that the residual gas flows from auxiliary combustion chamber 12 to main combustion chamber 4 (see FIG. 19(b)). When intake valve 7 opens, fresh air flows into main combustion chamber 4 (see FIG. 19(c)). Since the ICE described in connection with FIG. 17(a) includes port fuel injection, fuel is injection in intake port 5 prior to IVO, and the fresh air that initially flows into main combustion chamber 4 contains a large amount of fuel.

Figure 19D:
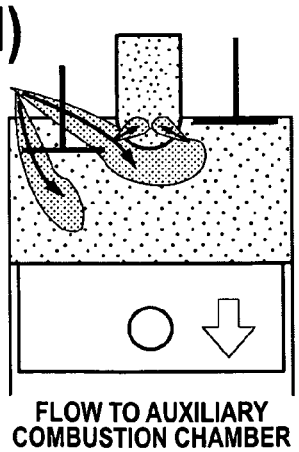
Figure 19E:
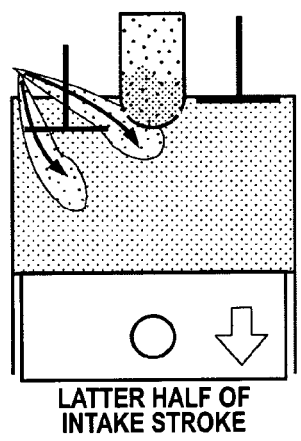
Figure 19F:
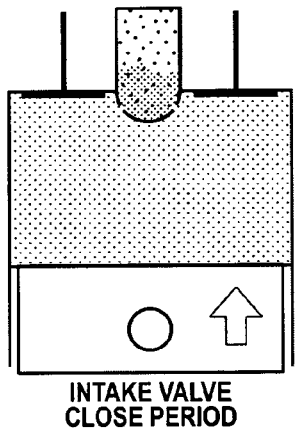
Figure 19G:
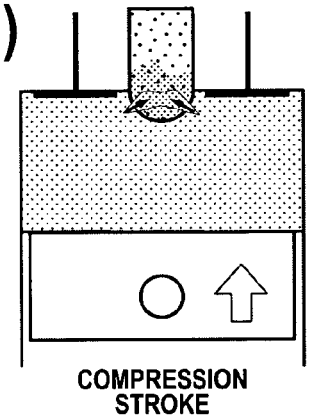
Figure 19H:
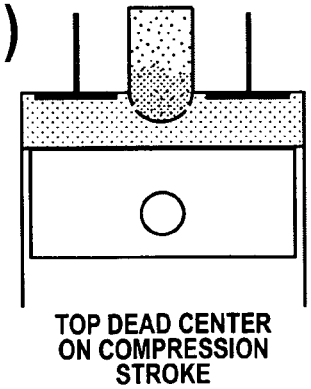

When the fresh air flows into main combustion chamber 4, the pressure in main combustion chamber 4 increases so as to produce a second pressure differential between auxiliary combustion chamber 12 and the chamber 4, and the working mixture flows from main combustion chamber 4 to auxiliary combustion chamber 12 (see FIG. 19(d)). The working mixture that flows into auxiliary combustion chamber 12 from main combustion chamber 4 includes fresh air, fuel, and residual gas. However, it is envisioned that a structure may be employed such that the fresh air (containing fuel) is directed to a position near communicating passages 13a, and the flow into auxiliary combustion chamber 12 is almost only fresh air (containing fuel), i.e., such that only a small amount of the residual gas flows back into auxiliary combustion chamber 12.

Later, in the intake stroke, the second pressure differential between auxiliary combustion chamber 12 and main combustion chamber almost disappears and thus the flow almost disappears. However, fresh air (containing fuel) continues to be supplied from intake port 5 to main combustion chamber 4 (see FIG. 19(e)). The fresh air (containing fuel) that continues to flow provides an A/F mixture that is lean as compared with the A/F mixture that flows just after IVO. Subsequently, the compression stroke of piston 3 commences and, until intake valve 7 closes, no particular flow occurs between main combustion chamber 4 and auxiliary combustion chamber 12. However, after intake valve 7 closes, the pressure in main combustion chamber 4 increases (see FIG. 19(f)) due to the compression stroke of piston 3, and a third pressure differential causes the working mixture in main combustion chamber 4 to flow into auxiliary combustion chamber 12 (see FIG. 19(g)). Until IVC, the A/F mixture in auxiliary combustion chamber 12 is richer than that in main combustion chamber 4 and, thus, the A/F mixture in auxiliary combustion chamber 12 is gradually diluted by flow from main combustion chamber 4 during the compression stroke (see FIG. 19(h)).

Figure 20:
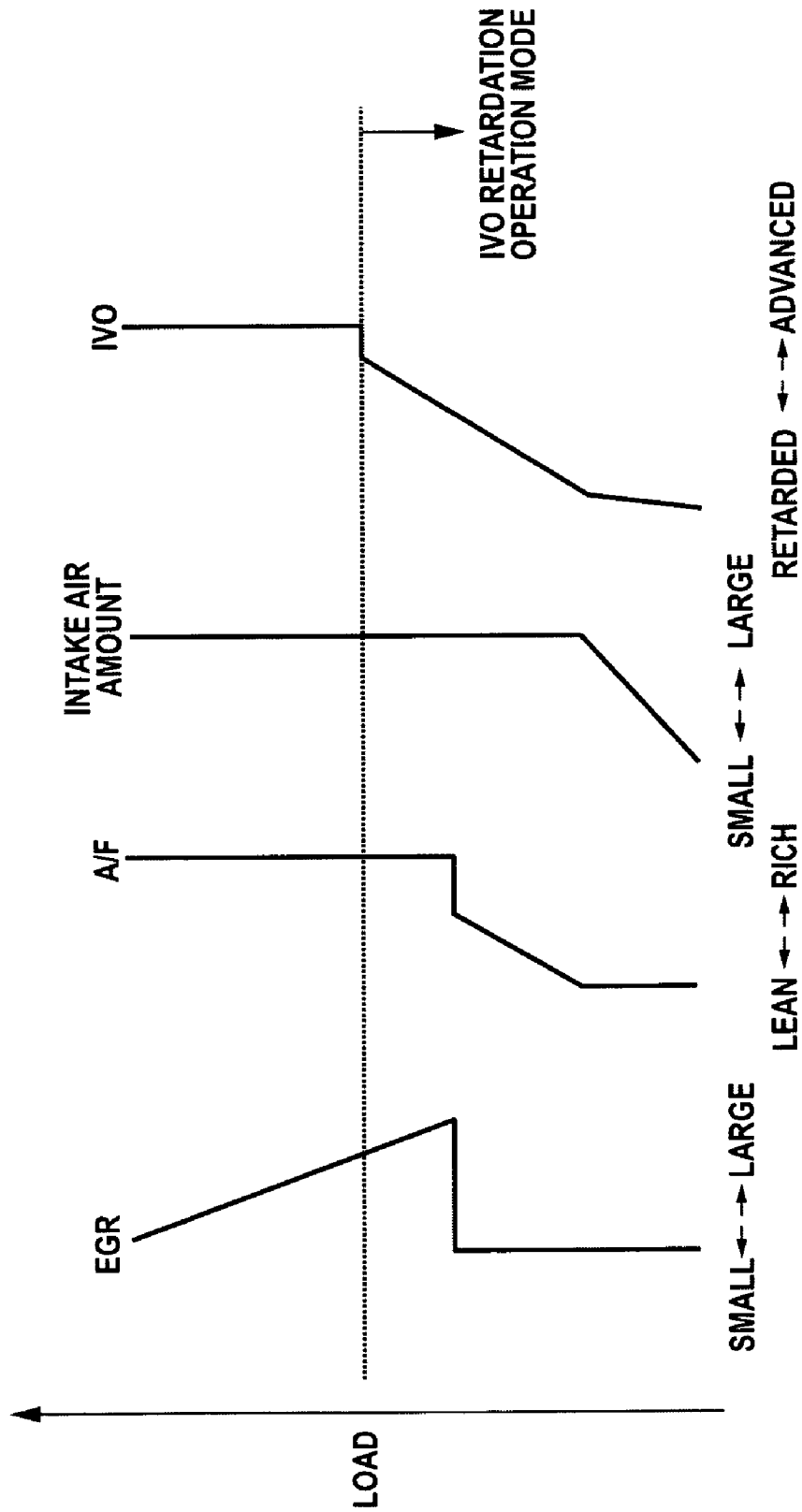
FIG. 20 illustrates a relationship between exhaust gas recirculation control, air/fuel ratio, intake air amount, and intake valve open timing in the internal combustion engine shown in FIG. 17(a).

FIG. 20 shows a chart that illustrates preferred relationships of the ICE described in connection with FIG. 17(a) for the control of the EGR, the A/F mixture, the intake air amount, and the IVO timing. Since the control is substantially the same as that described in connection with FIG. 6, explanation of the control will not be repeated.

Figure 21:
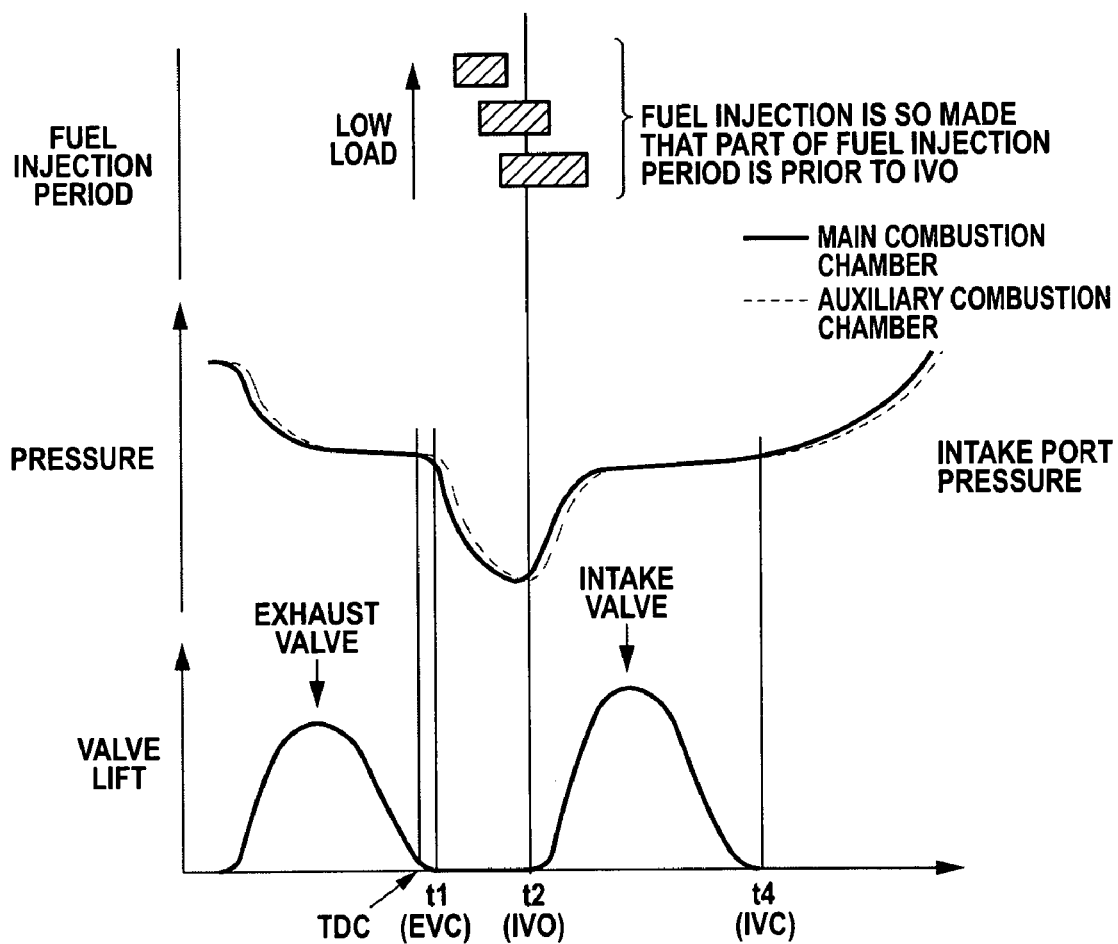
FIG. 21 is a timing chart explaining retardation of the intake valve open timing in the internal combustion engine shown in FIG. 17(a).

FIG. 21 is a timing chart of the ICE described in connection with FIG. 17(a) including the IVO retardation operation mode. Basically, this timing chart generally corresponds to the timing chart shown in FIG. 7. However, since the ICE described in connection with FIG. 17(a) includes port fuel injection, the fuel injection timing is set so that at least part of the fuel injection period occurs prior to IVO (at time t2), with the start of the fuel injection timing being advanced as the engine load decreases. This is because, as mentioned hereinabove, combustion stability becomes poor as the engine load decreases, and it is therefore desirable to advance the start of fuel injection so as to increase the fuel fed to auxiliary combustion chamber 12 during the cylinder pressure increasing period, i.e., following IVO. Consequently, ignition is made easier and combustion stability is improved. Accordingly, for the same reasons, it is also preferable to advance the start of fuel injection as the A/F mixture fed to the ICE is diluted and/or the supply of EGR is increased.

The ICE described in connection with FIGS. 17-21 provides achievements that are similar to the achievements provided by the ICE described in connection with FIGS. 1-7. In particular, the ICE described in connection with FIGS. 17-21 provides similar achievements but with an ICE including port fuel injection rather than direct fuel injection. Similar to the ICEs described in connection with FIGS. 1-16, the ICE described in connection with FIGS. 17-21 avoids the undesirable phenomenon of a lean A/F mixture in auxiliary combustion chamber 12, so that ignition is facilitated and improved combustion stability is achieved.

Additionally, according to the IVO retardation operation mode of the ICE described in connection with FIGS. 17-21, the pressure in main combustion chamber 4 that occurs after opening of the intake decreases as the degree of IVO retardation increases, and a large amount of residual gas in auxiliary combustion chamber 12 can be replaced with a mixture of fresh air and fuel. That is, by varying the IVO timing, the residual gas in auxiliary combustion chamber 12 is reduced and the A/F mixture in both main combustion chamber 4 and auxiliary combustion chamber 12 can be enriched. Accordingly, ignition is facilitated and improved combustion stability is achieved.

Figure 22:
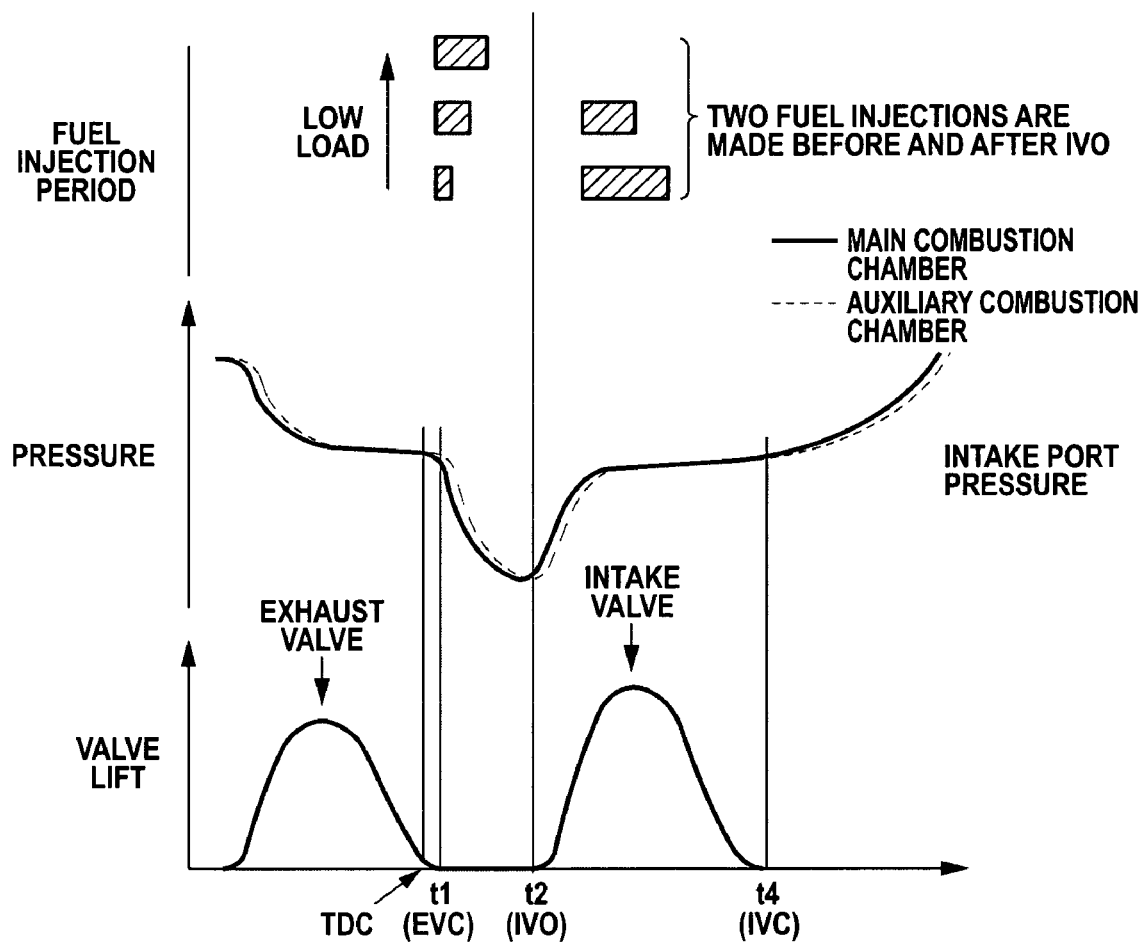
FIG. 22 is a timing chart explaining an alternate fuel injection scheme.

FIG. 22 is a timing chart explaining an alternate fuel injection scheme for the ICE described in connection with FIG. 17(a). Thus, only portions that differ from the ICE explained with respect to FIGS. 17-21 will be described hereinafter.

Whereas FIG. 21 illustrates that as the engine load decreases, the IVO retardation operation mode advances the starting time of a single fuel injection that injects the total amount of the fuel to be supplied during one cycle, FIG. 22 illustrates an alternate IVO retardation operation mode wherein, as the engine load increases, the total amount of the fuel to be supplied during one cycle is divided between two fuel injections. So as to be distinguished with respect to the previously described first and second fuel injections, the two fuel injections are referred to as a third fuel injection and a fourth fuel injection. The third fuel injection occurs before IVO, i.e., the third injection is advanced with respect to the IVO timing, and the fourth fuel injection occurs after the IVO, i.e., it is retarded with respect to the IVO timing. Further, the amount of the fuel that is injected during the third fuel injection, as a percentage of the total amount of the fuel to be supplied during one cycle, increases as the engine load decreases. As in the previously described ICEs with IVO retardation operation mode, it is preferable to similarly increase the amount of the fuel that is injected during the third fuel injection, as a percentage of the total amount of the fuel to be supplied during one cycle, as the A/F mixture supplied to the ICE is diluted and/or as the supply of EGR increases.

In addition to the achievements provided by the ICE described in connection with FIGS. 17-21, the ICE described in connection with FIG. 22 also provides the following achievements.

Since the third fuel injection occurs prior to IVO and the fourth fuel injection occurs after IVO, the amount of the fuel that is injected during the third fuel injection controls the concentration of the A/F mixture in auxiliary combustion chamber 12. By controlling the A/F mixture at the time of ignition, for example, ignition may be facilitated and combustion stability may be improved.

Preferably, the fuel amount injected by the third fuel injection (as a portion of the entire amount of fuel supplied in one cycle) is increased in response to decreasing the engine load, in response to leaning the A/F mixture fed to the engine, and/or as the EGR supply increases. Thus, the amount of fuel flow to auxiliary combustion chamber 12 increases to avoid conditions in which it may be difficult to maintain stable combustion. Accordingly, improved ease of ignition and combustion stability are achieved even when the ICE operates with a much lower load, with a much leaner A/F mixture, or with an increased supply of EGR.

The flowchart shown in FIG. 5 similarly describes ICE operation in accordance with FIGS. 1-7, FIGS. 17-21 and FIG. 22. As such, the explanation of such ICE operation will not be repeated.

Figure 23A:
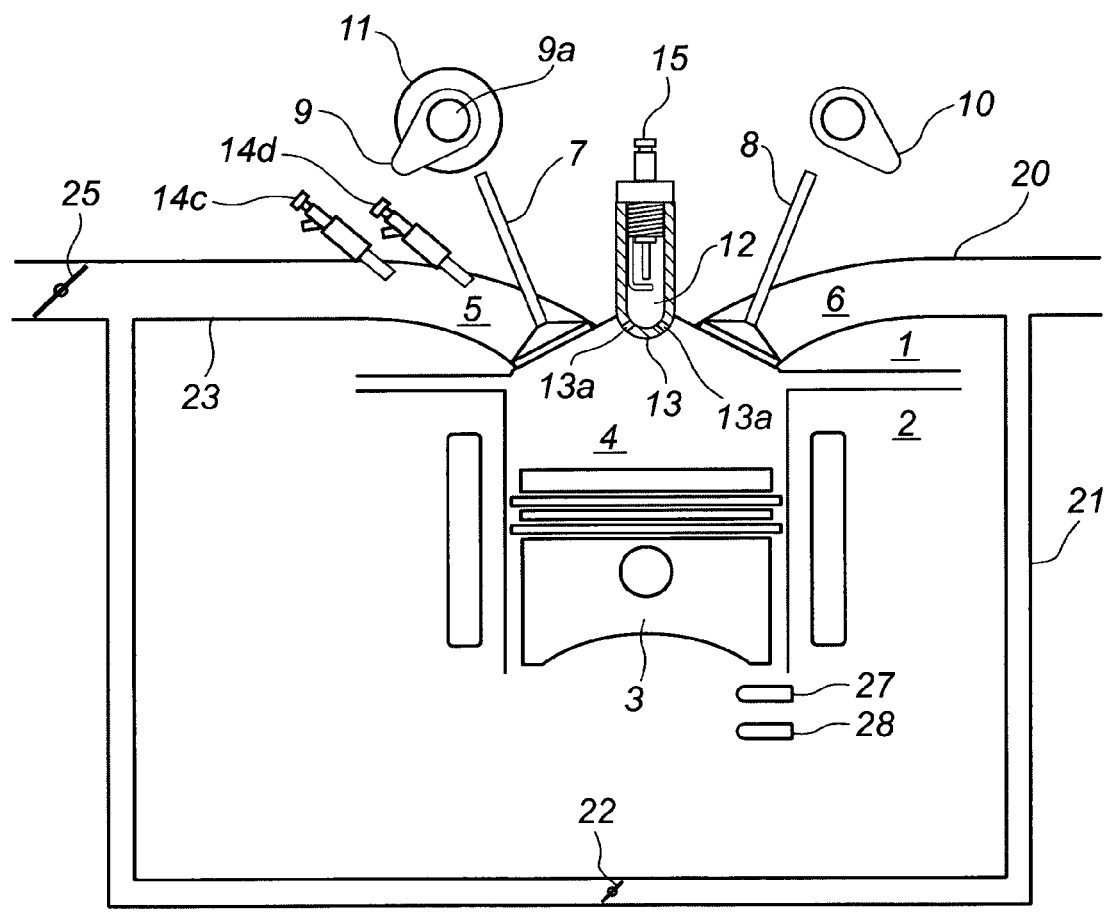
FIG. 23(a) is a schematic illustration showing yet another construction of an internal combustion engine including an auxiliary combustion chamber.
Figure 23B:
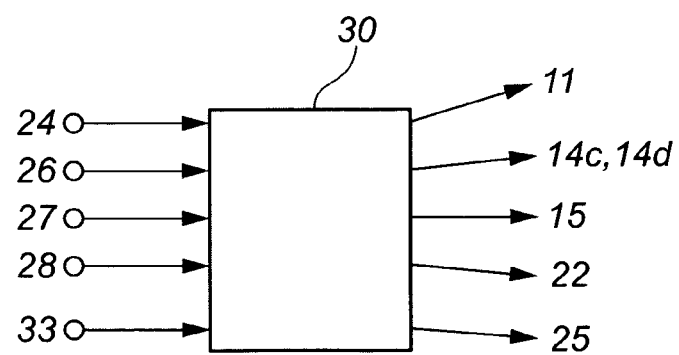
FIG. 23(b) is a schematic of an electronic control unit for the internal combustion engine shown in FIG. 23(a).

FIGS. 23(a) and 23(b) show an ICE in which a plurality of port fuel injection valves are disposed at intake port 5. Otherwise, the arrangements of the ICE shown in FIG. 23(a) and the ECU shown in FIG. 23(b) are similar to those described in connection with FIGS. 17-21, and descriptions thereof will not be repeated. Only those portions that differ with respect to FIGS. 17-21 will now be described.

FIG. 23(a) shows a schematic view of an ICE that includes a fuel injection valve 14c that injects into intake port 5 gasoline as a type of hydrocarbon type fuel, and includes a gaseous fuel injection valve 14d that injects into intake port 5 a reformed gaseous fuel that is produced by partially oxidizing gasoline. Otherwise, the arrangement of the ICE shown in FIG. 23(a) is similar to the ICE shown in FIG. 17(a). As it is used herein, "gaseous fuel" refers to a fuel that is produced from gasoline by using a reformer (not shown), and that is more easily ignited than gasoline.

Figure 24:
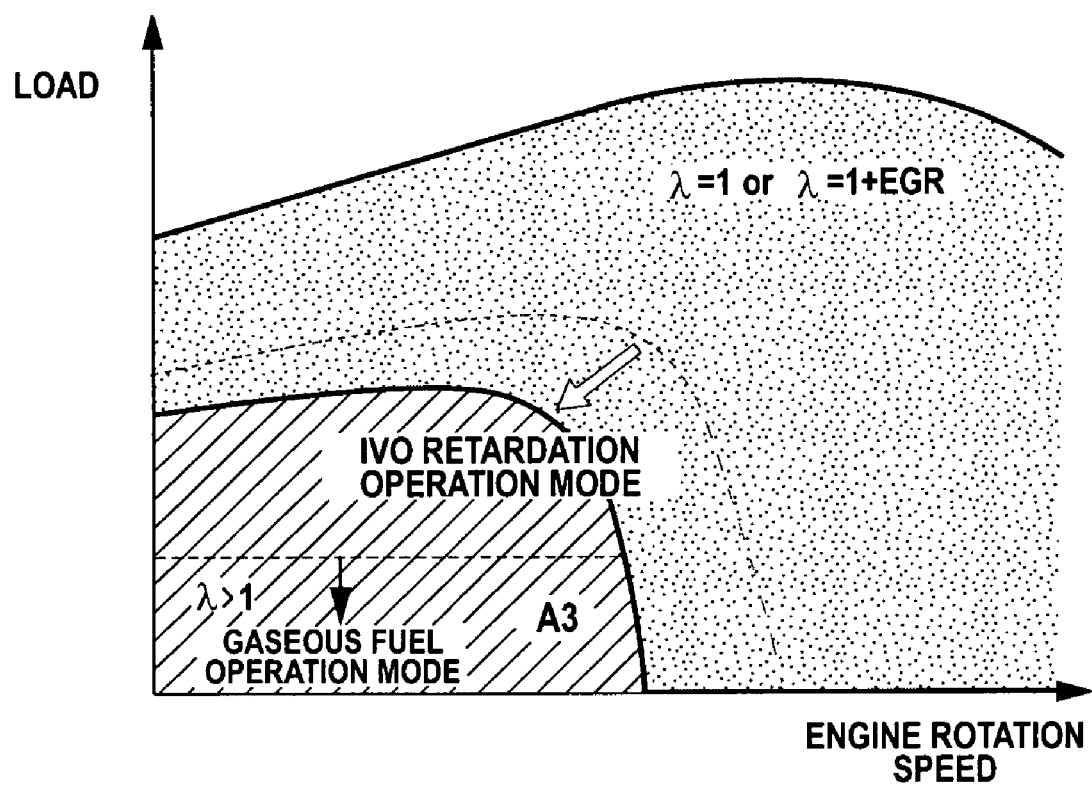
FIG. 24 is an operation map used in the internal combustion engine shown in FIG. 23(a).

FIG. 24 shows an operation map of the ICE described in connection with FIG. 23(a). Region A3 is a portion of the low-load range in which the IVO retardation operation mode operates with a lean A/F mixture. Region A3 is defined as a "gaseous fuel operation mode" wherein at least part of the fuel that is supplied to the ICE is gaseous fuel provided by gaseous fuel injection valve 14d. Otherwise, the operation map shown in FIG. 24 is similar to the operation map shown in FIG. 3.

Figure 25:
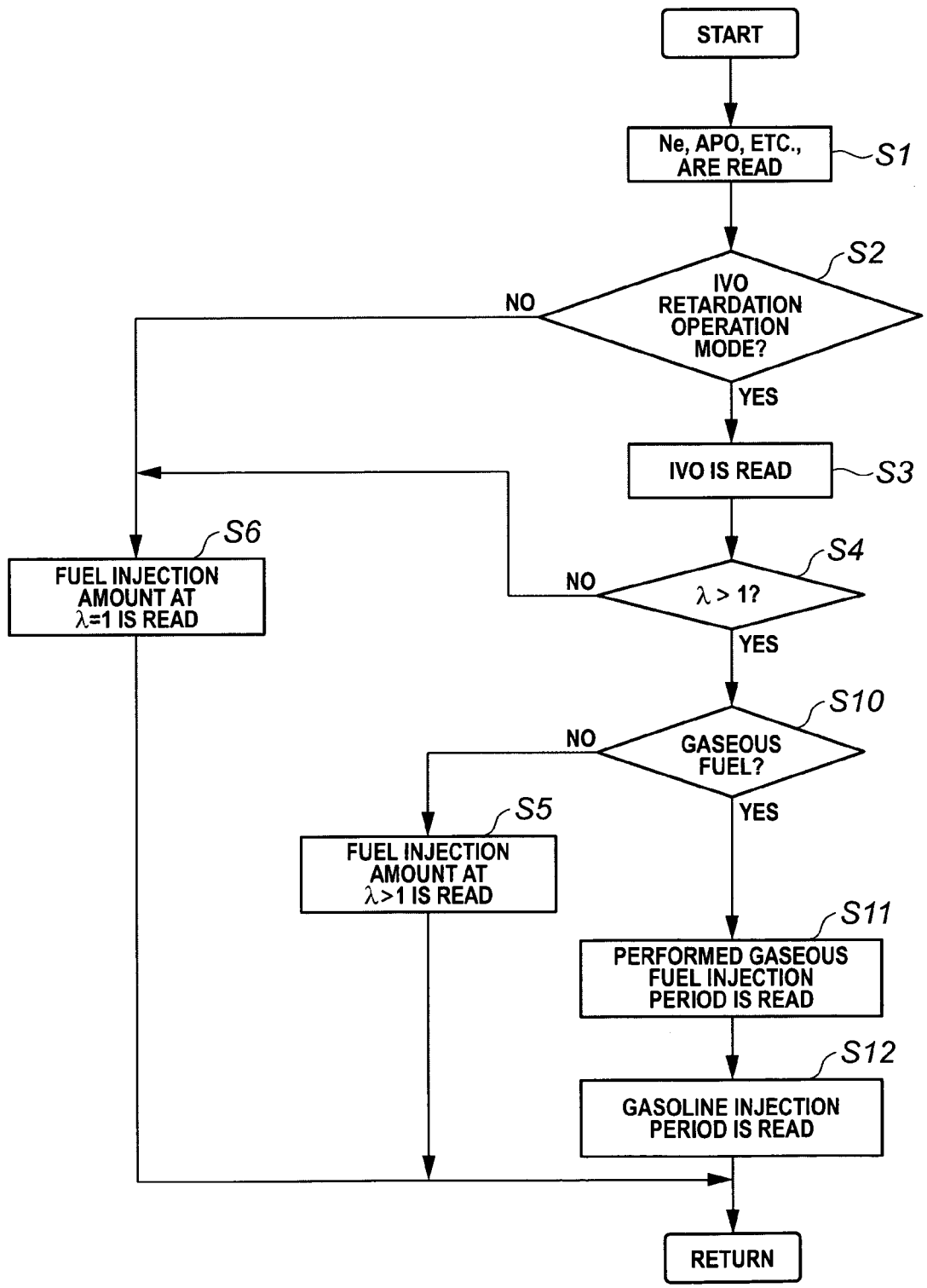
FIG. 25 is a flowchart explaining the operation of the internal combustion engine described with respect to FIG. 23(a).

FIG. 25 is a flowchart illustrating the operation of the ICE shown in FIG. 23(a). Insofar as some of the operation steps shown in FIG. 25 are similar to the operation steps show in FIG. 5, only steps that are different will be described hereinafter. At step S10 a decision is made as to whether or not gaseous fuel operation is appropriate for the calculated operating mode of the ICE shown in FIG. 23(a). If YES, i.e., if it is decided that the calculated operating mode is appropriate for the gaseous fuel operation mode, the operation flow proceeds to step S11 to set an amount of the gaseous fuel to be injected into intake port 5 by gaseous fuel injection valve 14d, and proceeds to step S12 to set an amount of fuel to be injected into intake port 5 by fuel injection valve 14c. Otherwise, the operating steps shown in FIG. 25 are similar to the operating steps shown in FIG. 5.

Figure 26:
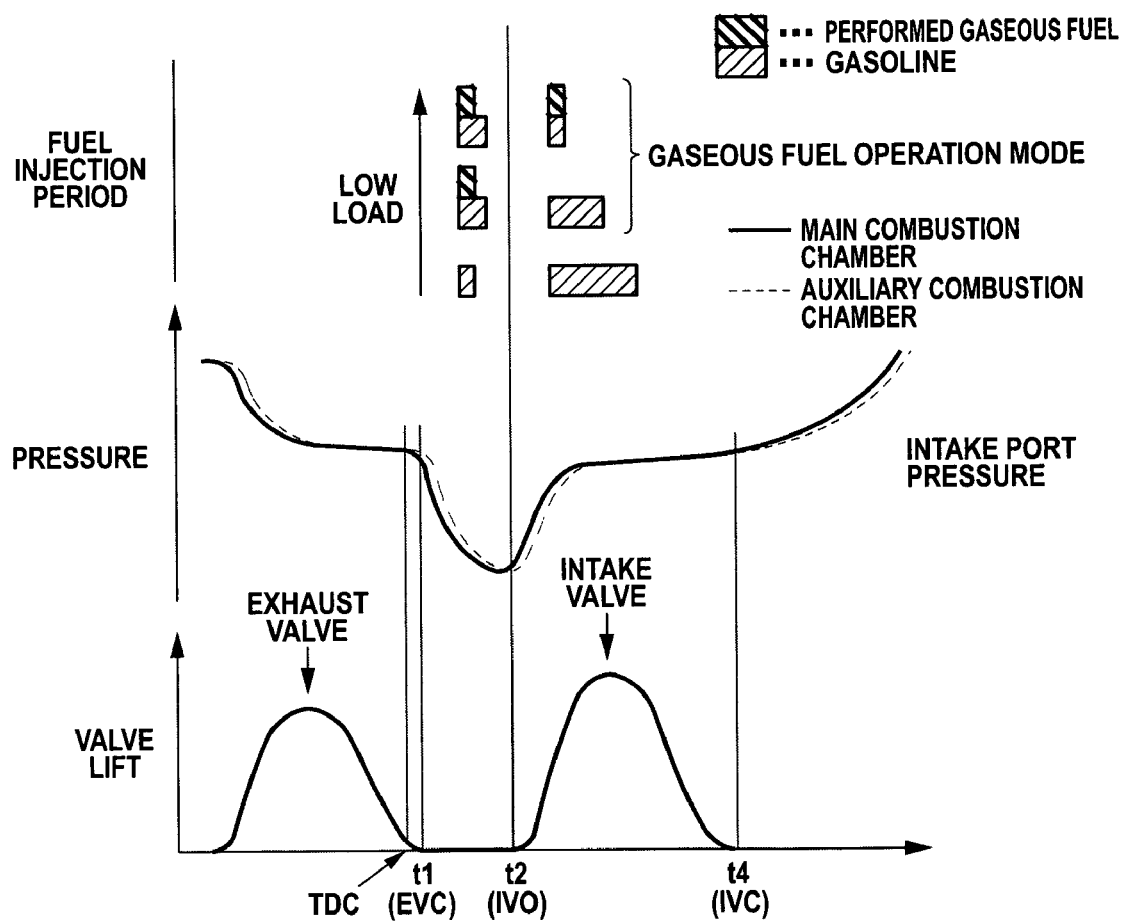
FIG. 26 is a timing chart explaining retardation of the intake valve open timing in the internal combustion engine shown in FIG. 23(a).

FIG. 26 is a timing chart of the IVO retardation operation mode for the ICE shown in FIG. 23(a). According to the gaseous fuel operation mode, at low engine loads gaseous fuel is injected both before and after the IVO, i.e., a first gaseous fuel injection is advanced with respect to the IVO timing and a second gaseous fuel injection is retarded with respect to the IVO timing. As the engine load increases, gaseous fuel is injected only before IVO, i.e., gaseous fuel injection is advanced with respect to the IVO timing, and at high engine loads, gaseous fuel is not injected. Carrying out injection of the gaseous fuel at both a timing that is advanced and at a timing retarded relative to the IVO timing makes it possible to operate the ICE at low engine loads with a very lean A/F mixture. As with the other ICEs described above, the amount of fuel that is injected before IVO, as a percentage of the total amount of the fuel to be supplied during one cycle, increases as the engine load decreases. Again, with IVO retardation operation mode, it is preferable to similarly increase the amount of the fuel that is injected before IVO, as a percentage of the total amount of the fuel to be supplied during one cycle, as the A/F mixture supplied to the ICE is diluted and/or as the supply of EGR increases.

In addition to the achievements provided by the ICE described in connection with FIGS. 17-21, the ICE described in connection with FIGS. 23-26 also provides the following achievements.

Since, in the gaseous fuel operation mode, the easily ignited gaseous fuel flows into the ICE just after IVO, the gaseous fuel flows into auxiliary combustion chamber 12. Thus, facilitates ignition and stable combustion reliably produce a torch jet.

Preferably, the gaseous fuel amount injected by the gaseous fuel injection valve 14*d* (as a portion of the entire amount of fuel supplied in one cycle) is increased in response to decreasing the engine load, in response to leaning the A/F mixture fed to the engine, and/or as the EGR supply increases. Thus, the amount of gaseous fuel flow to auxiliary combustion chamber 12 increases to avoid conditions under which it may be difficult to maintain stable combustion. Accordingly, improved ease of ignition and combustion stability are achieved even when the ICE operates with a much lower load, with a much leaner A/F mixture, or with an increased supply of EGR.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. An internal combustion engine comprising:
    a piston reciprocally displaced in response to rotation of a crankshaft;
    a main combustion chamber, the main combustion chamber being at least partially defined by the piston;
    an auxiliary combustion chamber;
    a partition disposed between the main combustion chamber and the auxiliary combustion chamber, the partition including at least one passage providing fluid communication between the main combustion chamber and the auxiliary combustion chamber;
    an exhaust valve reciprocally disposed with respect to the main combustion chamber;
    an intake valve reciprocally disposed with respect to the main combustion chamber;
    a variable valve timing device coupled to the intake valve, the variable valve timing device retarding movement of the intake valve relative to movements of the piston and the exhaust valve when a engine parameter representing combustion stability indicates a predetermined operation condition the retarding producing:
        a first pressure differential across the at least one passage between the main combustion chamber and the auxiliary combustion chamber, the first pressure differential including a lower pressure in the main combustion chamber relative to the auxiliary combustion chamber in response to an intake stroke of the piston; and
        a second pressure differential across the at least one passage between the main combustion chamber and the auxiliary combustion chamber, the second pressure differential including a higher pressure in the main combustion chamber relative to the auxiliary combustion chamber in response to an open configuration of the intake valve with respect to the main combustion chamber; and
    a fuel injection valve supplying fuel to be combusted in the main and auxiliary combustion chambers, such that the fuel injection valve injects the fuel while a pressure becomes the second pressure differential from the first pressure differential so that at least part of the fuel arrives at said at least one passage.

2. An internal combustion engine as claimed in claim 1, wherein the fuel injection valve delivers first and second portions of the fuel that is supplied during a combustion cycle, the first portion is delivered during the first pressure differential, and the second portion is delivered after a delay following the delivery of the first portion.

3. An internal combustion engine as claimed in claim 1 wherein the piston comprises a crown including a first contour redirecting toward the at least one passage at least part of the fuel that is supplied, the redirecting by the first contour occurring during the second pressure differential.

4. An internal combustion engine as claimed in claim 1, wherein the fuel injection valve is disposed with respect to the main combustion chamber so as to directly inject the fuel into the main combustion chamber.

5. An internal combustion engine as claimed in claim 1, further comprising:
    an intake passage extending from the main combustion chamber, fluid communication between the intake passage and the main combustion chamber being permitted in the open configuration of the intake valve and being prevented in a closed configuration of the intake valve with respect to the main combustion chamber.

6. An internal combustion engine as claimed in claim 5, wherein the fuel injection valve is disposed with respect to the main combustion chamber so as to inject the fuel into the intake passage.

7. An internal combustion engine as claimed in claim 6, wherein the fuel injection valve comprises a hydrocarbon fuel injection valve and a gaseous fuel injection valve.

8. An internal combustion engine as claimed in claim 1, wherein the auxiliary combustion chamber has a capacity smaller than that of the main combustion chamber.

9. An internal combustion engine as claimed in claim 1, further comprising:
    an ignition plug disposed with respect to the auxiliary combustion chamber, the ignition plug providing a spark to ignite a first air/fuel mixture in the auxiliary combustion chamber.

10. An internal combustion engine as claimed in claim 9, wherein the first air/fuel mixture ignited in the auxiliary combustion chamber comprises a torch flame being jetted through the at least one passage and igniting a second air/fuel mixture in the main combustion chamber.

11. An internal combustion engine as claimed in claim 1, wherein the retarding is in response to an engine load less than a predetermined value.

12. An internal combustion engine as claimed in claim 1, wherein the retarding further provides:
a third pressure differential between the main combustion chamber and the auxiliary combustion chamber, the third pressure differential including a higher pressure in the main combustion chamber relative to the auxiliary combustion chamber in response to a compression stroke of the piston.

13. An internal combustion engine as claimed in claim 12, wherein the piston comprises a crown including a second contour redirecting at least part of the fuel that is supplied so as to produce a stratified charge in the main combustion chamber, the redirecting by the second contour occurring during the third pressure differential.

14. An internal combustion engine comprising:
a main combustion chamber confronting a piston; intake and exhaust valves confronting the main combustion chamber;
an auxiliary combustion chamber having a capacity smaller than that of the main combustion chamber;
a partition wall provided between the main and auxiliary combustion chambers, the partition wall including at least one communicating passage providing fluid communication between the main and auxiliary combustion chambers;
a fuel injection valve supplying to the main combustion chamber fuel that is to be combusted; and
an ignition plug disposed with respect to the auxiliary combustion chamber, the ignition plug initiating combustion in the auxiliary combustion chamber such that a torch flame is produced and is jetted through the at least one communicating passage into the main combustion chamber to combust an air/fuel mixture in the main combustion chamber, and
wherein an open timing of the intake valve is retarded relative to a close timing of the exhaust valve and a top dead center timing of the piston on an exhaust stroke, the open timing of the intake valve being retarded in response to an engine parameter representing combustion stability which indicates a predetermined operation condition, and
wherein the fuel injection valve supplies the fuel to be combusted in the main and auxiliary combustion chambers, such that the fuel injection valve injects the fuel while a pressure becomes a second pressure differential from a first pressure differential so that at least part of the fuel arrives at said at least one communicating passage.

15. An internal combustion engine including a reciprocating piston, a main combustion chamber at least partially defined by the piston, a reciprocating intake valve and a reciprocating exhaust valve, the internal combustion engine comprising:
an auxiliary combustion chamber separated from the main combustion chamber by a partition including at least one passage providing fluid communication between the main and auxiliary combustion chambers;
variable valve timing means for reducing in the auxiliary combustion chamber residual gases from a previous cycle; and
a fuel injection valve supplying fuel to be combusted in the main and auxiliary combustion chambers, such that the fuel injection valve injects the fuel while a pressure becomes a second pressure differential from a first pressure differential so that at least part of the fuel arrives at said at least one passage.

16. An internal combustion engine as in claim 15, wherein the variable valve timing means produces the first and second pressure differentials across the at least one passage between the main and auxiliary combustion chambers when an engine parameter representing combustion stability indicates a predetermined operation condition, the first pressure differential including lower pressure in the main combustion chamber relative to the auxiliary combustion chamber, and the second pressure differential including higher pressure in the main combustion chamber relative to the auxiliary combustion chamber.

17. A method of reducing residual gas in an auxiliary combustion chamber of an internal combustion engine, the internal combustion engine including a main combustion chamber separated from the auxiliary combustion chamber by a partition, the partition including at least one passage providing fluid communication between the main and auxiliary combustion chambers, and the residual gas being from a previous combustion cycle of the internal combustion engine, the method comprising:
retarding timing of an intake valve opening relative to an exhaust valve closing and to a piston reaching top dead center on an exhaust stroke, the retarding producing a first pressure differential between the main and auxiliary combustion chambers when an engine parameter representing combustion stability indicates a predetermined operation condition, wherein pressure in the main combustion chamber is less than pressure in the auxiliary combustion chamber;
coupling in fluid communication an intake passage to the main combustion chamber, the coupling occurring at the end of the retarding and after the piston reaches top dead center, and the coupling producing a second pressure differential between the main and auxiliary combustion chambers, wherein pressure in the main combustion chamber is greater than pressure in the auxiliary combustion chamber; and
operating a fuel injection valve to supply fuel to be combusted in the main and auxiliary combustion chambers, such that the fuel injection valve injects the fuel while a pressure becomes the second pressure differential from the first pressure differential so that at least part of the fuel arrives at said at least one passage.

18. A method as in claim 17, wherein:
the operating of the fuel injection valve includes operating the fuel injection valve to perform a first injection of the fuel before the coupling.

19. A method as in claim 18, wherein the operating of the fuel injection valve comprises operating the fuel injection valve to perform a second injection after the coupling.

* * * * *